US012052373B1

(12) United States Patent
Kaliski, Jr. et al.

(10) Patent No.: US 12,052,373 B1
(45) Date of Patent: Jul. 30, 2024

(54) DELEGATED AGENT PROOF OF NETWORK IDENTIFIER CONTROL

(71) Applicant: VERISIGN, INC., Reston, VA (US)

(72) Inventors: Burton S. Kaliski, Jr., McLean, VA (US); Andrew Kaizer, Arlington, VA (US); Swapneel Sheth, Fairfax, VA (US)

(73) Assignee: Verisign, Inc., Reston, VA (US)

( * ) Notice: Subject to any disclaimer, the term of this patent is extended or adjusted under 35 U.S.C. 154(b) by 398 days.

(21) Appl. No.: 17/325,992

(22) Filed: May 20, 2021

(51) Int. Cl.
| | |
|---|---|
| H04L 9/32 | (2006.01) |
| H04L 61/4511 | (2022.01) |
| H04L 9/00 | (2022.01) |
| H04L 101/618 | (2022.01) |

(52) U.S. Cl.
CPC ........ *H04L 9/3247* (2013.01); *H04L 61/4511* (2022.05); *H04L 9/50* (2022.05); *H04L 2101/618* (2022.05)

(58) Field of Classification Search
None
See application file for complete search history.

(56) References Cited

U.S. PATENT DOCUMENTS

| | | | |
|---|---|---|---|
| 10,721,060 | B1 | 7/2020 | Kaizer et al. |
| 11,159,326 | B1 | 10/2021 | Nelson et al. |
| 11,354,658 | B2 | 6/2022 | Lyons et al. |
| 11,392,579 | B2 | 7/2022 | Kasimov et al. |
| 11,587,071 | B2 | 2/2023 | Ravinathan et al. |
| 11,621,829 | B2 | 4/2023 | Kaizer et al. |
| 11,632,236 | B1 | 4/2023 | Kaizer et al. |
| 2007/0130316 | A1 | 6/2007 | Turakhia |
| 2007/0143469 | A1 | 6/2007 | Adams et al. |
| 2008/0235383 | A1 | 9/2008 | Schneider |
| 2011/0296440 | A1 | 12/2011 | Laurich et al. |
| 2012/0011360 | A1 | 1/2012 | Engels et al. |
| 2012/0174198 | A1 | 7/2012 | Gould et al. |

(Continued)

FOREIGN PATENT DOCUMENTS

| | | |
|---|---|---|
| CN | 107705114 A | 2/2018 |
| CN | 109981633 A | 7/2019 |

(Continued)

OTHER PUBLICATIONS

International Search Report and Written Opinion for Application No. PCT/US2022/030241, dated Oct. 6, 2022, 8 pages.

(Continued)

*Primary Examiner* — Brandon Hoffman
*Assistant Examiner* — Mayasa A. Shaawat
(74) *Attorney, Agent, or Firm* — Lee & Hayes, P.C.

(57) ABSTRACT

Systems, methods, and computer products for associating a network identifier with a network address enable operations that may include: receiving a network identifier associated with a first network; obtaining an identification of a proof provider; sending, to the proof provider, a network address associated with a second network, wherein the proof provider is configured to generate a signed association of the network identifier with the network address using a private key of the proof provider; obtaining the signed association; and providing, to the second network, at least the signed association. The second network may be configured to validate the signed association and store the signed association.

24 Claims, 13 Drawing Sheets

(56) References Cited

U.S. PATENT DOCUMENTS

| | | | |
|---|---|---|---|
| 2015/0278820 A1 | 10/2015 | Meadows | |
| 2016/0173439 A1 | 6/2016 | Kaliski, Jr. et al. | |
| 2016/0196300 A1 | 7/2016 | Kamdar et al. | |
| 2016/0292672 A1 | 10/2016 | Fay et al. | |
| 2017/0180134 A1 | 6/2017 | King | |
| 2017/0310484 A1 | 10/2017 | Kaliski, Jr. et al. | |
| 2017/0324738 A1 | 11/2017 | Hari et al. | |
| 2017/0330174 A1 | 11/2017 | Demarinis et al. | |
| 2017/0344988 A1 | 11/2017 | Cusden et al. | |
| 2017/0346833 A1 | 11/2017 | Zhang | |
| 2018/0227275 A1 | 8/2018 | Russinovich et al. | |
| 2018/0262493 A1 | 9/2018 | Andrade | |
| 2018/0276663 A1 | 9/2018 | Arora | |
| 2018/0287997 A1 | 10/2018 | Li et al. | |
| 2019/0121988 A1 | 4/2019 | van de Ruit et al. | |
| 2019/0156040 A1 | 5/2019 | Sasin et al. | |
| 2019/0166085 A1 | 5/2019 | Li et al. | |
| 2019/0220831 A1 | 7/2019 | Rangarajan | |
| 2019/0236571 A1 | 8/2019 | Arora et al. | |
| 2019/0253252 A1* | 8/2019 | Qiu | H04L 9/3247 |
| 2019/0333054 A1 | 10/2019 | Cona et al. | |
| 2020/0021446 A1* | 1/2020 | Roennow | H04L 9/0819 |
| 2020/0058023 A1 | 2/2020 | Travizano et al. | |
| 2020/0145373 A1 | 5/2020 | Richardson | |
| 2020/0314055 A1* | 10/2020 | Blinn | H04L 61/4552 |
| 2020/0328883 A1 | 10/2020 | Kaizer et al. | |
| 2020/0382372 A1 | 12/2020 | Easwar Prasad et al. | |
| 2020/0403809 A1 | 12/2020 | Chan et al. | |
| 2021/0037013 A1 | 2/2021 | Salkintzis | |
| 2021/0135867 A1 | 5/2021 | Zeng et al. | |
| 2021/0243028 A1* | 8/2021 | Song | H04L 9/0825 |
| 2022/0103370 A1 | 3/2022 | Alwen et al. | |
| 2022/0376889 A1 | 11/2022 | Kaizer et al. | |
| 2022/0376925 A1 | 11/2022 | Kaizer et al. | |

FOREIGN PATENT DOCUMENTS

| | | |
|---|---|---|
| CN | 112671950 A | 4/2021 |
| CN | 112765684 A | 5/2021 |
| JP | 2021-524978 A | 9/2021 |
| WO | 2018007828 A2 | 1/2018 |
| WO | 2020/150741 A1 | 7/2020 |
| WO | 2022/246189 A1 | 11/2022 |
| WO | 2022/246193 A1 | 11/2022 |

OTHER PUBLICATIONS

International Search Report and Written Opinion for Application No. PCT/US2022/030248, dated Oct. 6, 2022, 6 pages.

U.S. Notice of Allowance for U.S. Appl. No. 17/325,687, dated Apr. 17, 2023, 25 pages.

International Search Report and Written Opinion issued in International Application No. PCT/US2019/038447 on Sep. 30, 2019, pp. 1-15.

Domraider, "ICO Whitepaper," www.domraider.io, SIRET 79417114000013 [retrieved on Aug. 25, 2019]. Retrieved from the Internet: URL:https://s3-eu-west-1.amazonaws.com/domraider/domraider/DomRaider+ICO+Whitepaper+EN.pdf pp. 1-127.

Johnson, N., "How to claim your DNS domain on ENS," The Ethereum Name Service, Nov. 11, 2017, https://medium.com/the-ethereum-name-service/how-to-claim-your-dns-domain-on-ens-e600ef2d92ca, accessed Jun. 29, 2018, pp. 1-4.

Moosavi, "Rethinking Certificate Authorities: Understanding and Decentralizing Domain Validation," Concordia Institute for Information Systems Engineering, Montreal, Quebec, Canada, Apr. 2, 2018, [retrieved on Aug. 25, 2019]. Retrieved from the Internet: URL:https://pdfs.semanticscholar.org/7e38/b0c0e6f7066de9821b8fab6a489a 79907 44f.pdf pp. 1-92.

Tarasov, P. "Internet Voting Using Zcash," University of Dublin, Trinity College, May 2017 [retrieved on Aug. 25, 2019]. Retrieved from the Internet: URL:https://scss.tcd .ie/publications/theses/diss/20 17/TCD-SCSS-DISSERTATION-2017-015.pdf pp. 1-89.

International Preliminary Report on Patentability issued in International Application No. PCT/US2019/038447 on Jan. 7, 2021, pp. 1-13.

Notice of Allowance issued in U.S. Appl. No. 16/024,488 on Mar. 13, 2020, 30 pages.

Office Action issued in U.S. Appl. No. 16/402,047 on Feb. 1, 2021, 14 pages.

Office Action issued in U.S. Appl. No. 16/402,047 on May 11, 2021, 9 pages.

Office Action issued in U.S. Appl. No. 16/515,825 on Apr. 15, 2021, 14 pages.

Office Action issued in U.S. Appl. No. 16/402,047 on Aug. 9, 2021, 10 pages.

Office Action issued in U.S. Appl. No. 16/515,825 on Sep. 20, 2021, 19 pages.

Baritz et al., ID4me—Technical White Paper DRAFT, Version 14, Feb. 28, 2020, 39 pages.

Bertola, V., ID4me, Technical overview, Version 1.4, Oct. 4, 2019, 16 pages.

Bertola, V., ID4me, General Overview, Version 1.3, Oct. 6, 2019, 5 pages.

Dan.com, "Domain Industry, Let us Innovate.", Retrieved from the Internet: https://blog.undeveloped.com/domain-industry-join-us-in-becoming-innovative-thriving-again-a751d2e17ae9, Nov. 21, 2017 [retrieved on Sep. 17, 2021], pp. 1-6.

DNS Registrar guide—Ethereum Name Service, Retrieved from the Internet on Sep. 22, 2021: https://docs.ens.domains/dns-registrar-guide, pp. 1-5.

Einarrson, B., "[DNSOP] Verifying TLD operator authorisation," Retrieved from the Internet: https://mailarchive.ietf.org/arch/msg/dnsop/qaDjnArp98T0gIBYQbUfswwaxrg, Jun. 18, 2019 [retrieved on Sep. 17, 2021], 1 page.

Hollenbeck, S., "Extensible Provisioning Protocol (EPP) Domain Name Mapping," RFC 4931, Retrieved from the Internet: https://datatracker.ietf.org/doc/html/rfc4931, May 2007 [retrieved on Sep. 7, 2021], pp. 1-46.

Hollenbeck, S., "Extensible Provisioning Protocol (EPP)," RFC 5730, Retrieved from the Internet: https://datatracker.ietf.org/doc/html/rfc5730, Aug. 2009 [retrieved on Sep. 7, 2021], pp. 1-67.

Hollenbeck et al., "Security Services for the Registration Data Access Protocal (RDAP)," RFC 7481, Retrieved from the Internet: https://tools.ietf.org/html/rfc7481, Mar. 2015 [retrieved on Sep. 7, 2021], pp. 1-13.

Johnson, N., "[DNSOP] Verifying TLD operator authorisation," Retrieved from the Internet: https://mailarchive.ietf.org/arch/msg/dnsop/AX5D3cqSTWF69pAWqu5Pn6SGXDs, Jun. 14, 2019 [retrieved on Sep. 17, 2021], 1 page.

Johnson, N., "ENS Root Change Will Allow Easy Integration of More Than 1300 DNS TLDs," Retrieved from the Internet: https://medium.com/the-ethereum-name-service/upcoming-changes-to-the-ens-root-a1b78fd52b38, Feb. 25, 2019 [retrieved on Sep. 7, 2021], 4 pages.

Johnson, N., "Introducing .luxe on ENS," Retrieved from the Internet: https://medium.com/@weka/introducing-luxe-on-ens-35a9ee2383ce, Oct. 2, 2018 [retrieved on Sep. 7, 2021], 4 pages.

Kuhl, R., "[DNSOP] Verifying TLD operator authorisation," Retrieved from the Internet: https://mailarchive.ietf.org/arch/msg/dnsop/DQEjRQZAafeGoMckNTt5GxSTe9g, Jun. 14, 2019 [retrieved on Sep. 17, 2021], 1 page.

Millegan, B., "ENS+.KRED: Major Integration of DNS and ENS Launches," Retrieved from the Internet: https://medium.com/the-ethereum-name-service/ens-kred-major-integration-of-dns-and-ens-launches-e7efb4dd872a, Feb. 19, 2020 [retrieved on Sep. 7, 2021], 3 pages.

Millegan, B., "Ethereum Name Service," Retrieved from the Internet on Sep. 7, 2021: https://vir.isi.edu/events/dinr2020/S/blantly-ENS.pdf, 24 pages.

Millegan, B., "Linking DNS with blockchain-based ENS records," Retrieved from the Internet on Sep. 7, 2021: https://conso.icann.org/sites/default/files/field-attached/presentation-dns-blockchain-ens-24jun19-en.pdf, 31 pages.

Monster, R., "Domain Leasing : How we do it at Epik, and how you can too!," Retrieved from the Internet: https://www.epik.com/blog/

(56) References Cited

OTHER PUBLICATIONS leasing-domains-how-we-do-it-at-epik-and-how-you-can-too.html, Mar. 27, 2020 [retrieved on Sep. 7, 2021], 14 pages.
Verisign, Inc., "Ethereum Name Service (ENS) Root Change Issues," Verisign Technical Note, Retrieved from the Internet: https://www.verisign.com/assets/labs/ens-root-change-issues-5.2020.pdf, Apr. 12, 2019 [retrieved on Sep. 22, 2021], pp. 1-2.

* cited by examiner

DELEGATED AGENT PROOF OF NETWORK IDENTIFIER CONTROL

FIELD

This disclosure relates generally to electronic ledgers and blockchain addresses, and more particularly to using electronic ledgers and/or blockchain addresses in conjunction with proving control of a network identifier, such as a domain name.

BACKGROUND

A network identifier infrastructure system may assign network identifiers to network resources present at network addresses. Network identifiers may include alphanumeric strings. For example, network identifiers may include human-readable names. Examples of network identifiers include internet domain names, social media handles, telephone numbers, email addresses, and digital object architecture handles. Network identifiers may be organized in a hierarchy, with top level network identifiers at the top, and any number of network identifiers below them in the hierarchy. The network resources to which such network identifiers are assigned by the network identifier infrastructure system may be any of a variety of network resources, such as network-connected computers, social media accounts, telephone connections, email servers, or digital object architecture objects. For example, an assignment may associate a network identifier with a network address for a network resource. The network addresses may be in the form of numerical labels, for example, internet protocol (IP) addresses or blockchain addresses (described further below). Such numerical labels may be difficult for typical humans to remember. Thus, network infrastructure systems may, for example, assign human-friendly network identifiers to network resources present at network addresses that are inconvenient for humans to retain and utilize. Typically, one network identifier is associated with one network address in a network identifier infrastructure system.

A particular type of network identifier infrastructure system is a domain name system (DNS). The term domain name system (DNS) may refer to, for example, a network identifier infrastructure system, such as a hierarchical distributed network identifier infrastructure system, for resources provided by computer servers that are connected to the internet. A DNS may associate a network identifier, such as domain name, to a network address, such as a numeric internet protocol (IP) address, of an internet resource. A DNS may thus allow computers to access networked resources, including web pages, using the assigned names.

In general, network infrastructure information (e.g., associations of network resources with network identifiers, public keys of asymmetric key pairs, signatures, etc.) may be stored in network infrastructure records. Further, network identifier infrastructure systems may include one or more authoritative record keepers or authoritative record entities. For example, a network identifier infrastructure system may include a network-accessible authoritative database that stores multiple network infrastructure records. Such an authoritative database may provide network infrastructure records to other, e.g., non-authoritative, network-accessible databases in the network. Some network identifier infrastructures are hierarchical, e.g., an authoritative record keeper or authoritative record entity may provide network infrastructure records to network-accessible databases that are under the authoritative record keeper or authoritative record entity in the hierarchy. Some such network identifier infrastructure systems may be structured such that an authoritative record keeper or authoritative record entity provides network infrastructure records to segments of the network, e.g., to portions of the network identifier namespace. For example, such a network identifier infrastructure system may provide to a respective database for that segment a network segment file, which may include network infrastructure records for resources that are present in that particular network segment.

An authoritative record keeper or authoritative record entity, such as in the context of a DNS, may be referred to as, for example, a registry. A registry may include an authoritative, master database of domain names registered under a top-level domain, or other domain in which domain names can be registered. A registry may include many hardware computer servers operably coupled to the internet. For ease of discussion, a registry may be identified with its computer servers and systems. Further, such as in the context of a DNS, network infrastructure records may be referred to as resource records or records (for short), a network segment may be referred to as a zone, and a file of resource records for a particular zone may be referred to as a zone file.

Network identifier infrastructure systems may utilize a registration facilitator(s) or a registration entity(ies) to register network identifiers to entities referred to as registrants. For example, a registration facilitator or registration entity may act as an intermediary between an authoritative record keeper or authoritative record entity and a person or end user entity that wishes to register a network identifier. The registration facilitator or registration entity may charge a fee to the registrant and convey registration information, e.g., the network identifier and a network address to which it is to be associated, to an authoritative record keeper or authoritative record entity. The authoritative record keeper or authoritative record entity may update its records accordingly. According to some networks, registrants are unable to directly interact with an authoritative record keeper or authoritative record entity, and instead interact through a registration facilitator(s) or a registration entity(ies).

In the context of a DNS, a registration facilitator or registration entity may be referred to as a registrar. Registrars may facilitate registration of domain names to registrants in the DNS. Registrars may compete with one another to register domain names for registrants through the DNS registry. For example, an internet user may interact with a registrar to register a domain name, thereby becoming a registrant for the domain name. Registrars may include many hardware computer servers. For ease of discussion, a registrar may be identified with its hardware computer servers unless otherwise specified or clear from context. Further, for ease of discussion, a registrant may be identified with its hardware client computer unless otherwise specified or clear from context.

The term network identifier infrastructure operator may refer to an authoritative record keeper or a registration facilitator, for example. Similarly, the term DNS operator may refer to a registry or registrar, for example.

An electronic ledger that records transactions may be referred to as a blockchain. Such transactions may include, for example, but are not limited to, cryptocurrency transactions. In general, a blockchain may be implemented as a decentralized distributed readable and writeable computer interpretable data structure, stored in various computers (e.g., nodes) in a blockchain network (e.g., a cryptocurrency network). A blockchain may be constructed from individual logical blocks. Each block may include any, or a combination, of: a timestamp representing a time of the block's creation, a cryptographic hash of an identification of the previous block, and a payload, which includes data that may represent transactions or other information. The data in the blockchain payload may represent, for example, for each of one or more transactions, a transaction identifier, a transaction amount, and the address associated with the receiving party (e.g., associated with the receiving party's public key).

Blockchain users may have an associated blockchain address and/or cryptographic key pair, e.g., an asymmetric cryptographic key pair. Such a key pair may be referred to as the user's blockchain key pair, that includes or consists of a public key (e.g., usable by the user to receive cryptocurrency) and a private key (e.g., usable by the user to send cryptocurrency). Each blockchain user may have a blockchain address that may serve as the user's identifier for purposes of the blockchain. For example, the blockchain address may be derived from the public key of the user's blockchain key pair, e.g., by applying a hash function. A first blockchain user may receive cryptocurrency from a second blockchain user, for example, who utilizes a blockchain address of the first blockchain user.

SUMMARY

Various embodiments include systems, methods, and computer products and media for associating a domain name with a blockchain address. In various implementations, the systems, methods, and computer products may perform, execute or enable operations, functions, and/or behaviors that include: receiving the domain name; obtaining, based on a Domain Name System (DNS) resource record for the domain name, an identification of a proof provider; sending, to the proof provider, the blockchain address, wherein the proof provider generates a signed association of the domain name with the blockchain address using a private key of the proof provider; obtaining the signed association of the domain name with the blockchain address; and providing, to the blockchain, at least the signed association of the domain name with the blockchain address. The blockchain may configured to validate the signed association of the domain name with the blockchain address and store the signed association of the domain name with the blockchain address in the blockchain.

Additional embodiments include systems, methods, and computer products and media for associating a network identifier with a network address. In various implementations, the systems, methods, and computer products may perform, execute or enable operations, functions, and/or behaviors that include: receiving a network identifier associated with a first network; obtaining an identification of a proof provider; sending, to the proof provider, a network address associated with a second network, wherein the proof provider is configured to generate a signed association of the network identifier with the network address using a private key of the proof provider; obtaining the signed association; and providing, to the second network, at least the signed association, wherein the second network is configured to validate the signed association and store the signed association.

In some embodiments, the obtaining the identification of the proof provider comprises obtaining the identification of the proof provider based on a network record. In some embodiments, the network record comprises the identification of the proof provider. In some such embodiments, the operations, functions, and/or behaviors may also include obtaining data sufficient to validate a trust chain to the identification of the proof provider; and the operation of providing, to the second network, at least the signed association may include providing, to the second network, the data sufficient to validate the trust chain. The second network may be configured to validate the trust chain.

In some embodiments, the operations further include sending the signed association to a network identifier infrastructure system for the first network, for storage in a network record for the network identifier.

In other embodiments, the operations further include initiating a transaction on the second network using the network identifier.

In yet other embodiments, the operations further include obtaining data sufficient to validate a trust chain to a public key of the proof provider, and the operation for providing, to the second network, at least the signed association may include providing, to the second network, the data sufficient to validate the trust chain; also, the second network may be configured to validate the trust chain, and the second network may be configured to validate the signed association using the public key of the proof provider.

In yet other embodiments, the operations further include receiving a notification that the association of the network identifier with the network address has been stored in the second network.

In some embodiments, the network record comprises an identification of an authority that provides a challenge for storage in a network record for the network identifier to prove control of the network identifier.

In some embodiments, the network identifier comprises at least one of: a social media handle, a telephone number, an email address, a domain name, or a digital object architecture handle.

In yet other embodiments, the operations further include receiving, from a registrant of the network identifier, an authorization for sending the network address to the proof provider.

In various system implementations, the system may include: a memory containing instructions; and a processor, operably connected to the memory, that executes the instructions to perform, execute, or enable the operations, functions, and/or behaviors described herein.

It is intended that combinations of the above-described elements and those within the specification may be made, except where otherwise contradictory.

BRIEF DESCRIPTION OF THE DRAWINGS

Various features of the embodiments can be more fully appreciated, as the same become better understood with reference to the following detailed description of the embodiments when considered in connection with the accompanying figures, in which.

DESCRIPTION OF THE EMBODIMENTS

Figure 1:
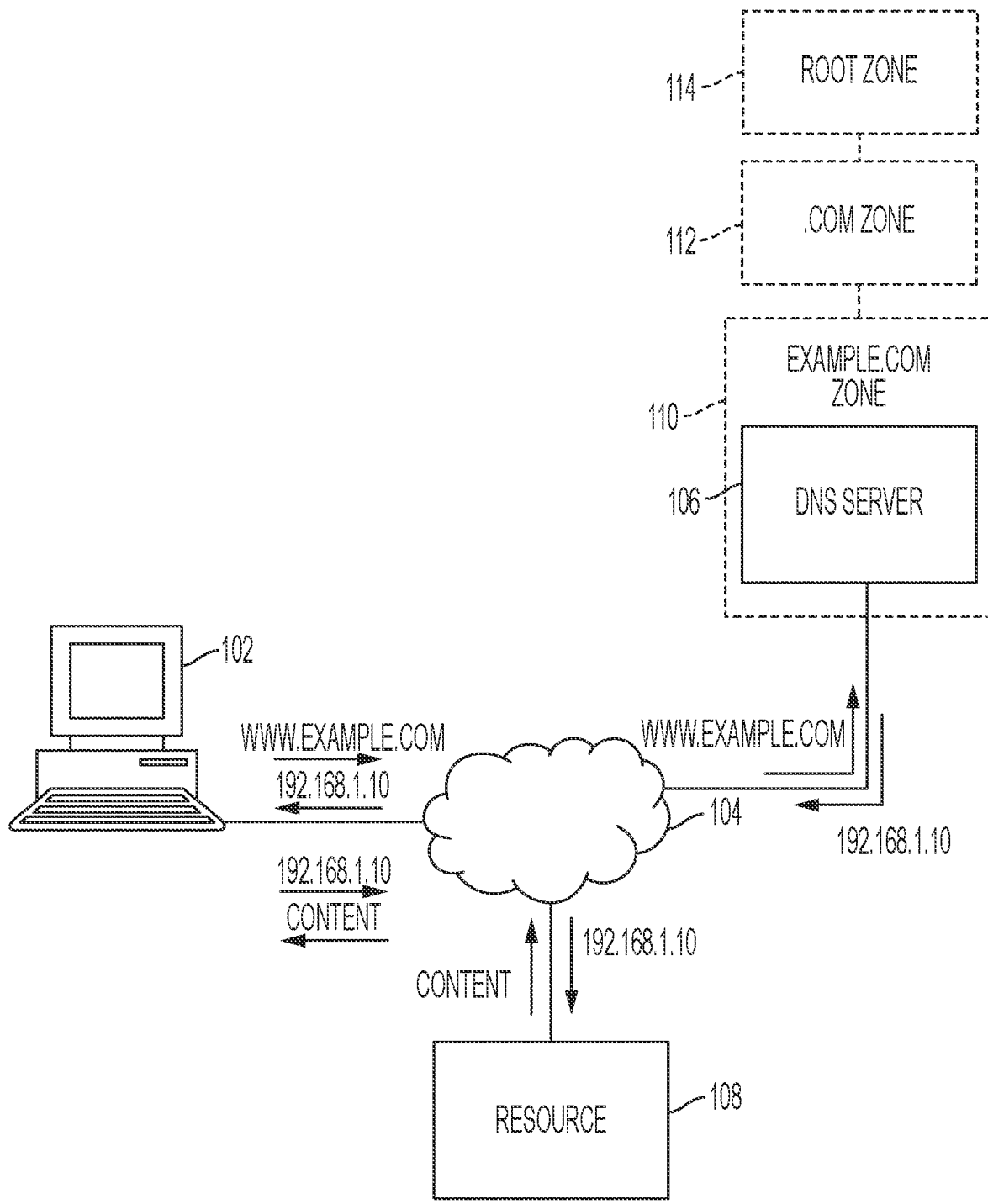
FIG. 1 is a schematic diagram depicting an example DNS interaction with a client.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

I. Introduction

Some embodiments provide techniques for proving control of a network identifier, e.g., a top level or second level network identifier, in a network identifier infrastructure system. Embodiments may be used by an authoritative record keeper (e.g., for a top level network identifier), a registration facilitator (e.g., for a top level or second level network identifier), or a registrant of the network identifier (e.g., for a second level network identifier) to prove such control, for example. In the context of a DNS in particular, some embodiments provide techniques for proving control of a top level domain name, such as dot COM, dot NET, dot EDU, etc., or a second level domain name, e.g., example.com, example.net, example.edu, etc. For example, a DNS registry or registrar may use an embodiment to prove control of a top level domain name. As another example, a DNS registrant may use an embodiment to prove control of a second level domain name.

The proof of control produced by embodiments may be forwarded to and used by a blockchain. For example, some embodiments may use a proof of control of a top level identifier to associate the top level network identifier with a blockchain address in a blockchain. According to such embodiments, the blockchain address may be for an executable program on the blockchain, such as a smart contract. Thus, some embodiments may be used to associate a top level network identifier with an executable program on a blockchain. As another example, some embodiments may use a proof of control of a second level network identifier to associate the second level identifier with a blockchain address in a blockchain. According to such embodiments, the blockchain address may be controlled by the registrant of the second level domain name. Thus, some embodiments may be used to associate a second level network identifier with a blockchain address. Subsequently, any entity can use the second level network identifier as an identifier of, or to locate or refer to, the registrant's blockchain address. According to some embodiments, from a blockchain user's perspective, the second level network identifier is used to locate and/or access the registrant's blockchain address, e.g., for purposes of conducting a blockchain transaction such as sending or receiving cryptocurrency.

Embodiments may be used to associate a top level network identifier with the blockchain address of an executable program on the blockchain, and a registrant of a second level network identifier under the top level network identifier may then use the executable program to associate its second level network identifier, (i.e., the second level network identifier of the registrant) with the registrant's blockchain address. For example, in some blockchains, entities that prove control of an identifier at a particular level, such as the top level in the network identifier infrastructure hierarchy, are authorized to establish associations of identifiers lower in the hierarchy with blockchain addresses. According to some embodiments, once a top level identifier is associated with an executable program on a blockchain, a registrant of a network identifier that is under the top level identifier in the hierarchy can use the executable program to establish an association of its network identifier with its blockchain address. Once the association of the lower level network identifier with the blockchain address is established in the blockchain, the registrant of the lower level network identifier, or any other blockchain user, can then use the lower level network identifier to find or access the blockchain address of the registrant in conducting blockchain transactions.

By way of non-limiting example, in the context of a DNS, a DNS registry for dot TLD (where "TLD" is a top level domain name such as COM, NET, EDU, etc.) may use an embodiment to prove control of dot TLD and associate dot TLD with a blockchain address for an executable program on the blockchain. Subsequently, a registrant of example.tld can interact with the executable program to associate example.tld with its blockchain address and use example.tld as a network identifier for the blockchain, e.g., for conducting transactions. For example, the association enables a more human friendly way to interact with other blockchain users by using a domain name as an address instead of base ten or hexadecimal numbers, such as a blockchain address. Further, the association permits a blockchain user to utilize its web presence, e.g., example.tld, as its blockchain presence.

For purposes of illustration rather than limitation, some embodiments are presented herein in the context of a DNS. However, embodiments are not limited to DNS environments. Rather, disclosed embodiments, including those presented in reference to FIGS. 3-12, may be implemented with any network infrastructure system.

These and other feature and advantages are presented in detail herein.

II. Resource Records and Trust Chains

FIG. 1 is a schematic diagram depicting, by way of background, an example DNS interaction. FIG. 1 depicts an overview of one example of how a DNS enables the internet to operate using domain names instead of numerical internet protocol (IP) addresses. For example, although networked computers generally rely on network addresses or locators, such as IP addresses, these network addresses or locators may be difficult for humans to remember or memorize. Accordingly, a DNS enables humans to use domain names, if they so desire, as network identifiers to access resources and data. As known to one of ordinary skill in the art, domain names are often easier for humans to recall. For example, domain names may be one or more non-space-delimited words, numbers, characters, combinations thereof, etc. that are used with a DNS to determine the IP address of an internet resource or webpage.

A user may operate client computer 102. The user may enter a domain name, e.g., www.example.com, in the navigation field of a web browser executing on client computer 102. Client computer 102 may operate and/or contact a recursive DNS server to look up the IP address corresponding to www.example.com. In particular, client computer 102 may send a resource record query to the recursive DNS server. For purposes of this example, the recursive DNS server lacks a resource record for www.example.com. According to a DNS protocol, the recursive DNS server may in this example query the root zone 114 for this resource record. By way of a DNS name server (NS) resource record, the root server points to a DNS server for dot COM zone 112, which provides an NS record that points to DNS server 106 for the zone for www.example.com, again, relying on an NS resource record. DNS server 106 responds with an appropriate DNS resource record (e.g., A or AAAA) that includes the requested IP address. Client computer 106 receives the resource record and may parse it to extract the IP address. Client computer 106 may then contact or connect to the IP address, which leads to resource 108, which may be a server computer. Resource 108 responds to client computer 106 with the requested data, e.g., content.

Standing alone, a DNS protocol or process may not include any authentication of or authentication mechanism for checking the validity of data sent between and from DNS servers. For example, a DNS that does not include authentication may be exposed to certain attacks, such as spoofing and man-in-the-middle attacks. Accordingly, a DNS benefits from ensuring data integrity provided by means for validating integrity of data, such as, for example, origin authentication of data, trust chains, the DNS Security (DNSSEC) protocol, and other mechanisms for authenticating data.

In general, a trust chain may include, for example, a directed series of nodes, each of which authenticates the following node in the chain. The first node in a trust chain may be authenticated by an external trust anchor. The nodes may be implemented as computer-interpretable, electronically stored records that include authentication information, such as a digital signature, public key, digital certificate, or hash. Such records may be implemented as resource records, for example, such as, but not limited to, public key resource records (e.g., DNSKEY resource records), delegation signer resource records (e.g., DS resource records), and/or signature resource records (e.g., RRSIG resource records). A relying party who trusts only the trust anchor can authenticate every node in the chain, including an object at the end of the trust chain.

Trust chains may not only provide scalable ways for an application to authenticate information throughout a trust hierarchy, but may also be transferrable. For example, an application or relying party can forward a trust chain to another relying party, who can then authenticate the same information itself without further interaction with other services.

In the context of a DNS, for example, a DNSSEC trust chain may start with a DNSSEC root anchor delegation signer (DS) resource record and extend through the DNS hierarchy via a series of digital signatures on DNS records or specific hashes of public keys. The links between nodes within a DNSSEC trust chain may take the form of either a public key in one node with a signature by the corresponding private key on the next, or a hash of a public key in one node with the corresponding public key in the next. For example, records in a DNSSEC trust chain can include either public keys for verifying digital signatures on subsequent records (e.g., Delegation Signer (DS) records, and Zone Signing Keys (ZSK)), or hashes of public keys of subsequent records (e.g., Key Signing Keys (KSK)). For DS and ZSK records, for example, a node may be authenticated by verifying its digital signature with a prior node's public key. For KSK records, for example, the node may be authenticated by comparing the hash of its content with a prior node's value.

Figure 2:
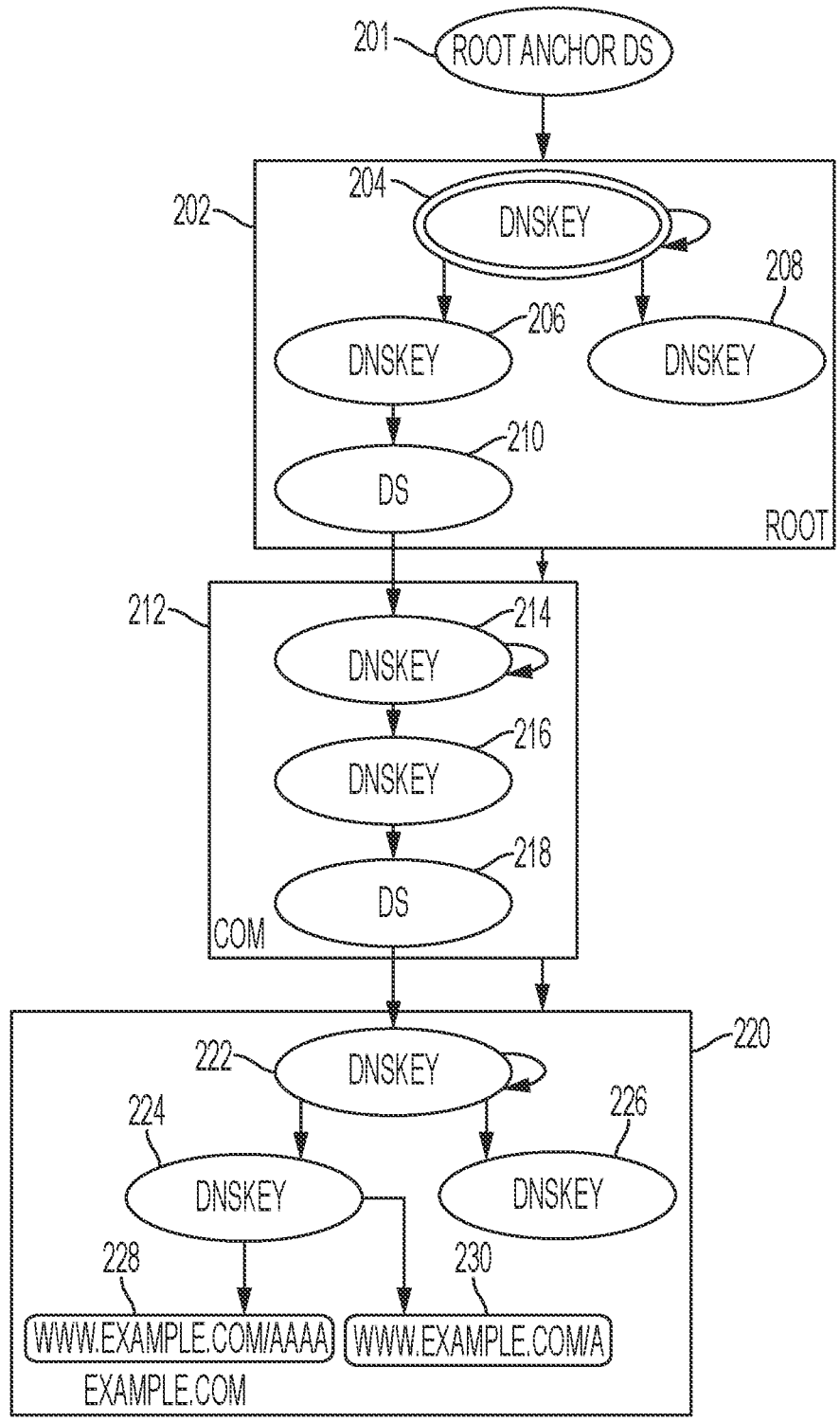
FIG. 2 is a schematic diagram of a DNS trust chain according to an embodiment.

FIG. 2 is a schematic diagram of a DNSSEC trust chain according to an embodiment. The example DNSSEC trust chain in this diagram has a total of 13 nodes 201, 204, 206, 208, 210, 214, 216, 218, 222, 224, 226, 228, and 230, including a root anchor DS DNSSEC resource record 201. This example shows the nodes in three groups 202, 212, 220, which correspond to zones 114 (root zone), 112 (dot com zone), and 110 (example.com zone), respectively, of FIG. 1. The nodes 204, 206, 208, and 210 are for the root zone group 202. In this example, resource records 206 and 208 are alternative second nodes.

The top of the trust chain is root anchor delegation signer (DS) DNS resource record 201. The root anchor DS DNSSEC resource record 201 may include a hash of the root zone's key signing key (KSK) of node 204. Although FIG. 2 depicts a trust chain with thirteen nodes in total, 201, 204, 206, 208, 210, 214, 216, 218, 222, 224, 226, 228, and 230, trust chains are not so limited. In general, a trust chain may include any number of nodes. Further, in general, trust chains may include DNSKEY nodes, DS nodes, and other type of nodes not limited to DNSKEY and DS nodes as shown in FIG. 2.

After root anchor DS DNSSEC resource record 201, the first DNSKEY resource record 204 in the first group may be for the root zone's key-signing key (KSK). This KSK may form part of an external trust anchor. The key signing key may be provided by an entity external to a root zone maintainer (RZM), for example, such as the Internet Assigned Numbers Authority (IANA). In various embodiments, the RZM may be the entity that provides services for the root zone, for example, services such as generating, editing, and distributing the root zone file. The DNSKEY records 206, 208 may be for the root zone's zone-signing keys (ZSKs), which are signed by the private key of the RZM corresponding to the KSK. In the example shown, only DNSKEY record 206 is part of the trust chain for example.com. A different trust chain (not shown) could be continued from DNSKEY record 208. The third node 210 in this group may include the delegation signer (DS) record for the dot COM zone's KSK. The DS record 210 may be signed by the private key corresponding to the root zone's ZSK 206, and may contain the hash of the dot COM zone's KSK (see 214, below).

As shown in FIG. 2, the nodes in the dot COM zone group 212 may be arranged in a manner that is similar to nodes 204, 206, and 210 of the root zone group 202. Thus, KSK record 214 may authenticate ZSK record 216 via a digital signature, ZSK record 216 may authenticate DS record 218 for example.com via a digital signature, and DS record 218 may authenticate the KSK in the next group 220 by including, for example, a hash value of the KSK of the next record 222.

The last group of nodes, for the example.com zone group 220, may start with the KSK-to-ZSK arrangement (222, 224, 226) and may further include a ZSK-to-object arrangement (224, 228, 230), where the ZSK record 224 authenticates the last nodes (228, 230) using a digital signature. As shown in the non-limiting example of FIG. 2, the last nodes (228, 230) may include AAAA record 228 and A record 230 for www.example.com. Resource records 228 and 230 may be authenticated via a digital signature by the private key corresponding to the example.com zone's ZSK (of record 224). There are thus two trust chains of length nine nodes shown in the example of FIG. 2, one including 204, 206, 210, 214, 216, 218, 222, 224, and 228, and the other including 204 206, 210, 214, 216, 218, 222, 224, and 230. Both begin with the trust chain of length eight nodes including 204 206, 210, 214, 216, 218, 222, and 224.

FIG. 2 reflects only a portion of the DNS resource records that would be present in practice. For example, not shown in FIG. 2 are the name server (NS) records that point to the name server for a zone. In practice, the other records, including the NS records, may also be signed by the ZSK for the zone. According to an embodiment, the name server records may not be part of the trust chain from the trust anchor to the object, but may instead be part of a trust chain to the name server where DNS records corresponding to other nodes, including the object, are obtained. Further, FIG. 2 does not show the full array of domains within each zone.

III. Setup Phase

Figure 3:
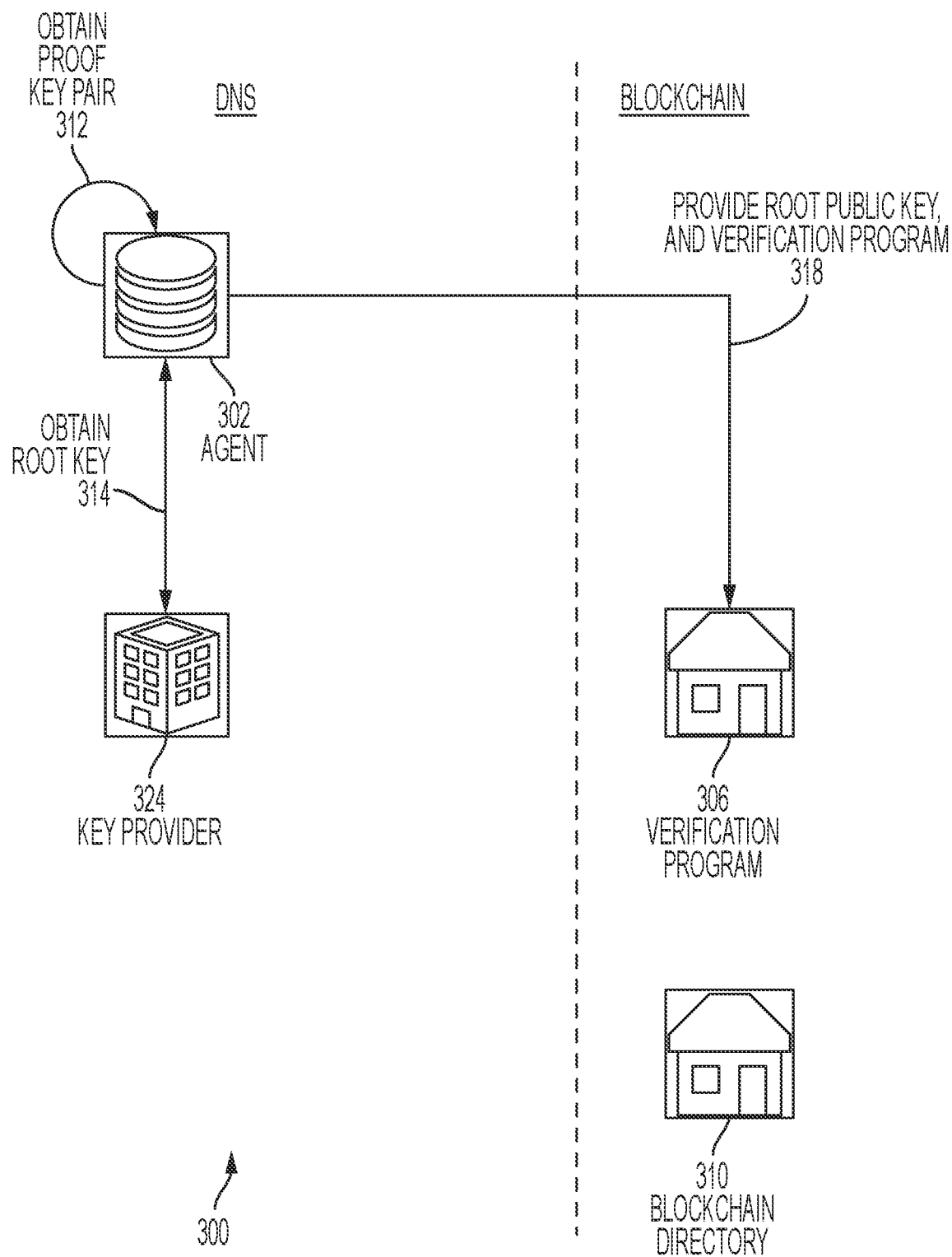
FIG. 3 is a schematic diagram of a setup method for preparing to prove control of a top level network identifier according to various embodiments.

FIG. 3 is a schematic diagram of a setup method 300 for preparing to prove control of a network identifier according to various embodiments. Setup method 300 may be performed to establish and configure the hardware, software, and protocol components used to perform the methods shown and described below in reference to FIGS. 9-12, for example. By way of non-limiting example, the left hand side of the diagram depicts the DNS environment, which may more generally be a network identifier infrastructure environment, and the right hand side depicts the blockchain environment, which may more generally be any environment that utilizes network addresses. In general, set up method 300 may be performed using hardware as shown and described below in reference to FIG. 13.

In general, embodiments may involve several different entities, which are shown and described in detail below in reference to FIGS. 3-10. For example, embodiments may include or involve a registrant of a network identifier or domain name (e.g., as represented by the registrant's computer or browser), a network identifier infrastructure system (e.g., a DNS), a blockchain, and one or more entities that issue, provide, and/or rely on associations of network identifiers with blockchain addresses. For example, the registrant may wish to associate, in the blockchain environment, its domain name (e.g., registrant.tld, where "tld" may be any top level domain name) with its blockchain address. Agent 302 may include an entity that provides and/or facilitates establishment of an association of a network identifier with a blockchain address in the DNS environment and/or blockchain environment and agent 302 may be considered to be a proof provider in various embodiments. According to some embodiments, agent 302 has its own domain name, referred to herein as "agent.tld", where "tld" may be any top level domain name. By way of non-limiting example, set up method 300 is described in reference to agent 302. However, embodiments are not so limited, and set up method 300 may be performed by any of a variety of entities, such as by an authoritative recordkeeper (e.g., a registry), a registration facilitator (e.g., a registrar), or a registrant.

Setup method 300 may begin with agent 302 obtaining 312 a proof key pair, e.g., an asymmetric cryptographic key pair. According to various embodiments described herein, agent 302 may use the private key of its proof key pair to sign data, such as an association of a network identifier with a blockchain address. Agent 302 may publish or otherwise make available the public key of its proof key pair, and any entity may utilize such a public key to validate a signature produced by the private key. In particular, according to various embodiments, agent 302 forms and stores in the zone file for its own domain name, agent.tld, a DNS resource record, e.g., a text resource record, that includes a copy of the public key of the proof key pair of agent 302. According to some embodiments, such a DNS resource record may be implemented as a text record, such as one labeled "_prf," and contain a copy of the public key, "0x999 . . . ", of the proof key pair. Agent 302 may obtain its proof key pair (and/or private key and address) by generating them itself, or by acquiring them from a different entity, such as a certificate authority.

Agent 302 may also obtain 314 a root zone key signing key public key from key provider 324, e.g., IANA. The root zone key signing key public key may be a public key of an asymmetric key pair that also includes a root zone key signing key private key. The root zone key signing key public key may form at least part of an external trust anchor, e.g., for a DNSSEC implementation. The root zone key signing key public key may be used to verify a signature produced by the root zone key signing key private key, for example.

Further, according to setup method 300, agent 302 may provide 318 a computer executable verification program 306 for inclusion in the blockchain. Verification program 306 may be in the form of a blockchain smart contract according to some embodiments. Agent 302 may include a copy of the root zone key signing key pair public key in, or accessible by, verification program 306. In operation, verification program 306 may perform a verification algorithm, such as, for example, defined by its computer executable code. According to an embodiment, the verification algorithm may accept as input data sufficient to validate a trust chain, determine whether the input is valid, e.g., using the root zone key signing key public key, and output a response indicating whether or not the input is valid. To validate the trust chain, verification program 306 may check each node in the trust chain for validity. Verification program 306 may check multiple types of nodes, e.g., nodes (such as ZSK or DS) that are signed by a private key corresponding to a public key of a previous node, and nodes (such as KSK) that have a hash of their public key included in the previous node. A ZSK node, a DS node, or another node may be authenticated by verifying its digital signature using the public key of a previous node (e.g., a node one level higher in the trust chain). A KSK node may be authenticated by comparing a hash of its public key with the contents of a previous node (e.g., a node one level higher in the trust chain). Example algorithms for both types of checks or verifications, referred to as signature verification and delegation verification, respectively, are presented below.

| Example Signature Verification Algorithm |
|---|
| 1. Input: data, signature on the data, and public key;<br>2. Apply public key to signature;<br>3. Check whether signature is valid (e.g., determine whether hash of data matches the public key as applied to the signature);<br>4. Output: results of determination at step 3. |

| Example Delegation Verification Algorithm |
|---|
| 1. Input: public key from node and data from previous node;<br>2. Hash public key;<br>3. Check whether hash of public key is valid (e.g., check whether hash of public key is present in data from prior node);<br>4. Output: results of determination at step 3. |

For example, to verify the first link in the trust chain from the root zone key signing key to the zone signing key in the root zone, verification program 306 may apply the example signature verification algorithm with one or more inputs of the root zone key signing key public key, the signature on the zone signing key, and the zone signing key, to decrypt the signature on the zone signing key by applying the root zone key signing key public key and then checking whether the decrypted signature is valid. In general, verification program 306 may check a trust chain for validity by applying one or more of the above algorithms one or more times, depending on the length of the trust chain and the type of nodes therein. For example, verification program 306 may check the validity of a trust chain by checking the validity of each link in the trust chain, e.g., by applying a signature verification algorithm or delegation verification algorithm to each link, depending on the link type. If all links are determined to be valid, then verification program 306 may output a result of valid, otherwise, it may output a result of invalid.

The presence of verification program 306 on the blockchain may serve as an entry point to associate a domain name with a blockchain address in the blockchain environment. Once verification program 306 is added to the blockchain per the request of agent 302, agent 302 receives back an address of the blockchain indicating where verification program 306 is stored in the blockchain. This address may serve as a blockchain address for verification program 306.

Further according to setup method 300, some embodiments may ensure that an executable program, e.g., blockchain directory 310, for associating domain names that are under the top level domain with blockchain addresses, is present on the blockchain. Blockchain directory 310 may keep track of which blockchain addresses are associated with which domain names in the blockchain, for example, the assignments of domain names to blockchain users. According to some embodiments, blockchain directory 310 is embodied by a program stored in the blockchain. For example, blockchain directory 310 may be an executable program stored in the blockchain. According to some embodiments, blockchain directory 310 may be implemented as a smart contract. For example, blockchain directory 310 may be implemented as an executable computer program or a transaction protocol that is intended to automatically execute under conditions specified in the program or protocol. In operation, blockchain directory 310 may accept as input a command to associate a specified domain name (e.g., a domain name under the top level domain name) with a specified blockchain address, and may store a record of such association upon processing such a command. For example, blockchain directory 310 may include or utilize a table of such stored associations between domain names and blockchain addresses.

Some blockchain networks permit users to use names having particular specified formats as the user's blockchain addresses. For such blockchains, the existing name services program on the blockchain can be adapted to store an association of a blockchain address with a domain name(s). For example, for some embodiments, an existing name services smart contract may be used as, or adapted for use as, a blockchain directory 310.

Whether newly added to the blockchain or adapted from an existing name service, blockchain directory 310 may be implemented as a smart contract on the blockchain. Consequently, blockchain directory 310 may have an associated blockchain address.

According to some embodiments, the functionality of the verification program 306 and the functionality of the blockchain directory 310 may be merged, such as by merging the verification program 306 and the blockchain directory 310. For example, a single smart contract present on the blockchain at a single blockchain address may perform the functions of both verification program 306 and blockchain directory 310 as described herein.

Figure 4:
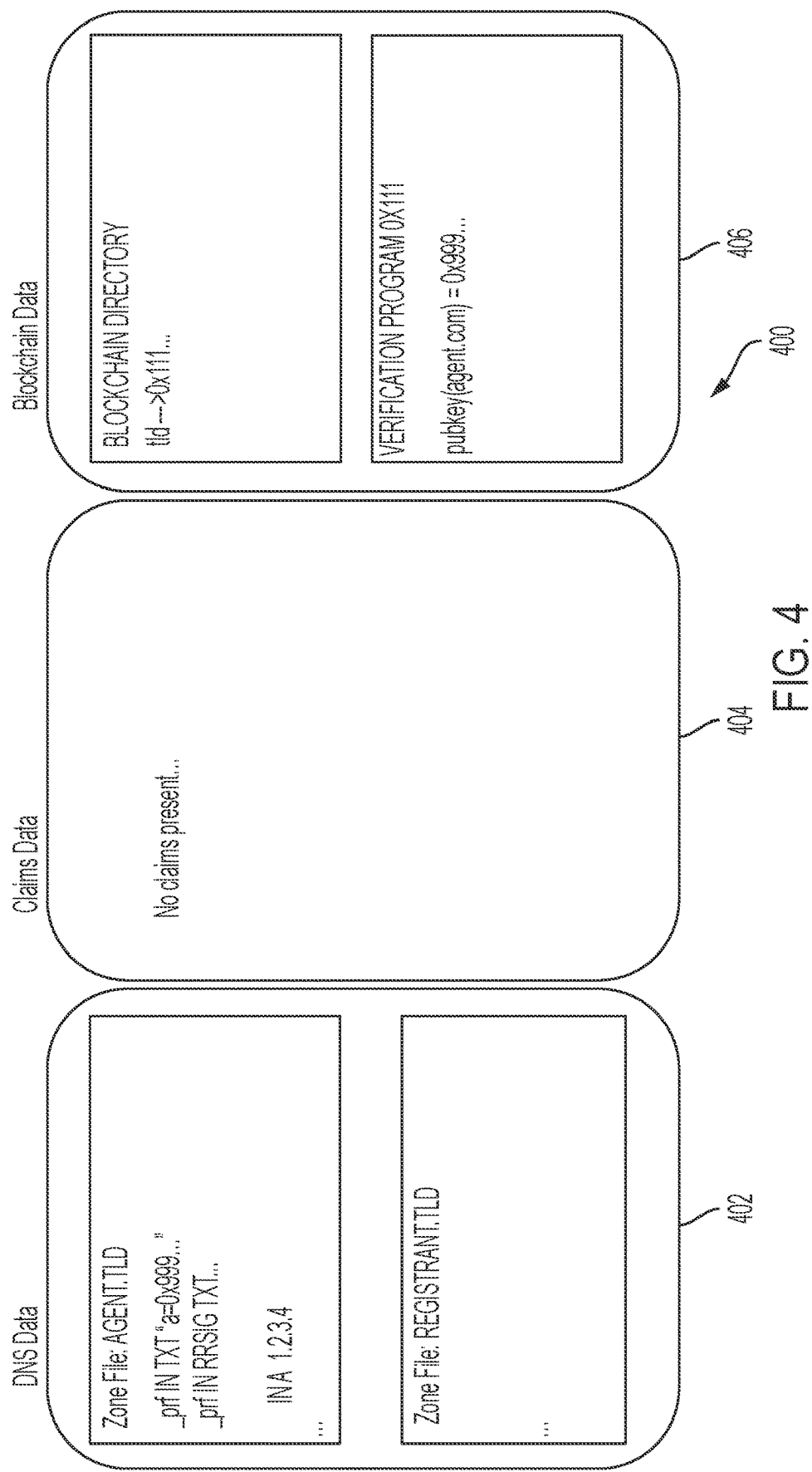
FIG. 4 is a state diagram of DNS data, claims data, and blockchain data prior to use of an embodiment.

FIG. 4 is a state diagram 400 of DNS data 402, claims data 404, and blockchain data 406 prior to use of an embodiment. The state of one or more of these data may be altered through the implementation of method 500 as shown and described below in reference to FIG. 5, for example, to achieve the status of the data shown and described below in reference to FIG. 6.

DNS data 402 may include DNS data for an agent, such as agent 302. Thus, DNS data 402 depicts a portion of a zone file for the agent's domain name, e.g., agent.tld as described above in reference to FIG. 3. As shown in FIG. 4, the zone file for agent.tld includes a text DNS resource record, such as _prf, that includes a copy of the public key of the agent's proof key pair, e.g., "0x999 . . . ". DNS data 402 may further include a signature of the _prf resource record, which may be included in a DNSSEC signature resource record (RR-SIG). DNS data 402 further includes DNS data for a registrant, e.g., a registrant that wishes to associate, in the blockchain environment, its domain name with its blockchain address. Thus, DNS data 402 depicts a portion of a zone file for the registrant's domain name, e.g., registrant-.tld, as described above in reference to FIG. 3. In general, DNS data 402 may be present in any of a variety of locations. For example, DNS data 402 may be present in one or multiple DNS zone files, e.g., with the zone file for agent.tld at a different physical and logical location from the zone file for registrant.tld.

Claims data 404 may be maintained by an agent such as agent 302 according to various embodiments. As shown in FIG. 4, claims data 404 lacks an association of registrant.tld with a blockchain address. After completion of method 500 of FIG. 5, claims data 404 is updated to include an association of registrant.tld with a blockchain address, as well as a signature on the association. After the association is established in claims data 404, the association may be propagated to the blockchain environment by method 900 of FIG. 9.

Blockchain data 406 includes a blockchain directory (e.g., blockchain directory 310). In general, the blockchain directory stores associations of blockchain addresses with network identifiers, such as domain names. In some embodiments, such an association may be stored as entries in respective columns in a database, e.g., the blockchain address may be stored in a first column for blockchain addresses, and the domain name may be stored in the same row in a second column for domain names (or other network identifiers).

Blockchain data 406 also includes a verification program (e.g., verification program 306). The verification program may verify one or more signatures or one or more trust chains or portions thereof, e.g., as described in reference to verification program 306 in reference to FIG. 3.

Figure 5:
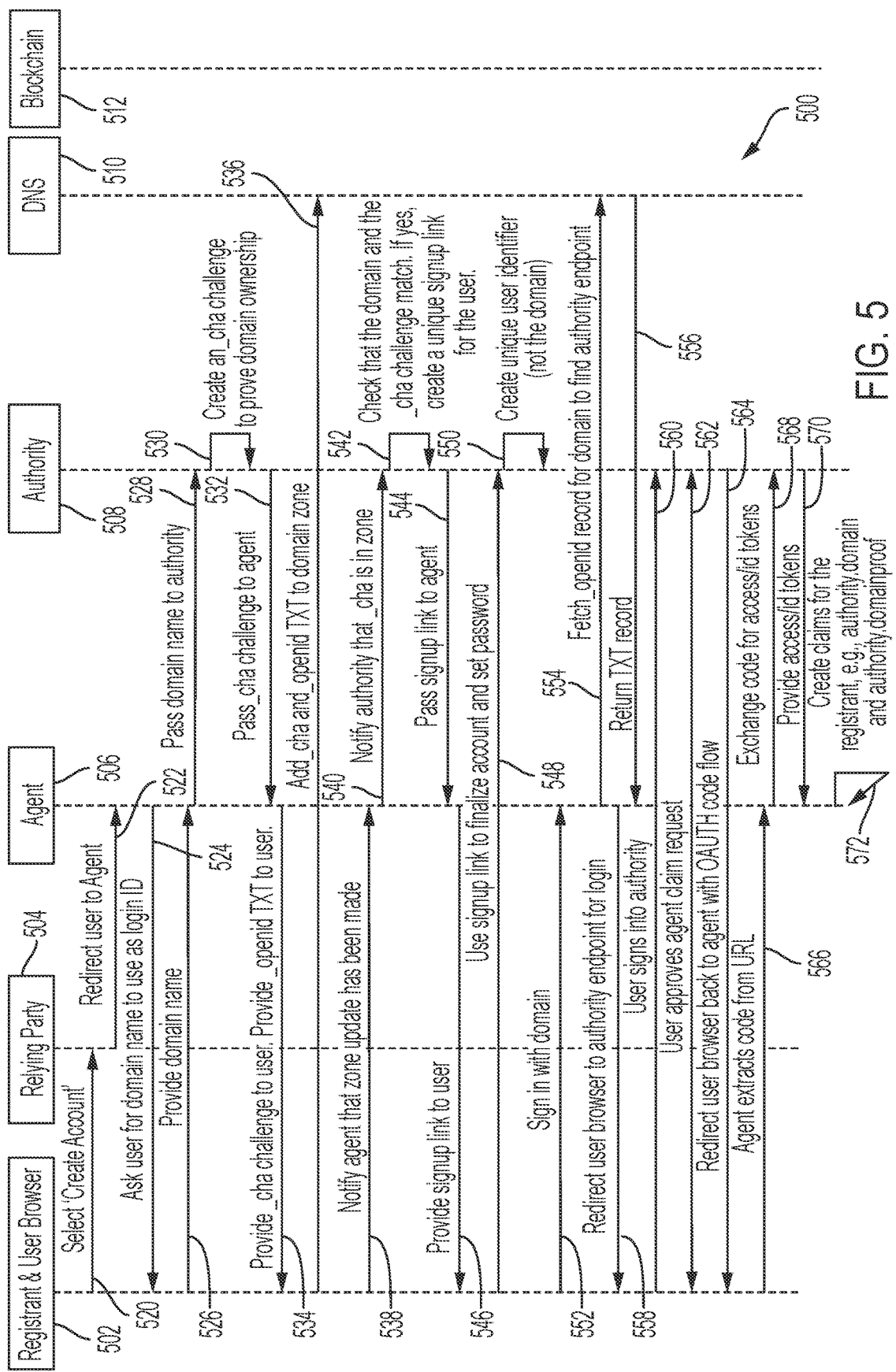
FIG. 5 is a messaging diagram for a method of signing up for an account with an agent according to various embodiments.

FIG. 5 is a messaging diagram for a method 500 of signing up for an account with an agent according to various embodiments. Prior to an application of method 500, DNS data, claims data, and blockchain data may be as shown and described above in reference to FIG. 4. Subsequent to an application of method 500, DNS data, claims data, and blockchain data may be as shown and described below in reference to FIG. 6. Method 500 may be practiced by or involve several entities, e.g., registrant 502, relying party 504, agent 506, authority 508, DNS 510, and blockchain 512, as described presently. Registrant 502 may be, for example, the registrant of registrant.tld as described above in reference to FIG. 4. Registrant 502 may wish to associate its domain name, registrant.tld, with its blockchain address.

Relying party 504 may be any entity that makes use of the association of the domain name registrant.tld with the blockchain address of registrant 502. Thus, relying party 504 may be or include a wallet, for example. Such a wallet may be a computer executable software program or application that facilitates interactions with a blockchain network. The wallet may execute on a user device such as a personal computer or a smart phone. The wallet may be used with a blockchain to facilitate the sending and receiving of cryptocurrency with other users of the blockchain. A wallet may have built in user-callable functionality to generate blockchain key pairs (and/or private keys and addresses) and send and receive cryptocurrency. A wallet, as contemplated herein, may have additional functionality as described further herein.

Agent 506 may include an entity that provides and/or facilitates establishment of an association of a network identifier with a blockchain address in the DNS environment and/or blockchain environment. Agent 506 may include agent 302 and may be considered a proof provider according to some embodiments. According to some embodiments, agent 506 is a registrant of a domain name, e.g., agent.tld, as described above in reference to FIG. 3. According to some embodiments, agent 506 may be an entity other than a registry or registrar for a domain name that is to be associated with a blockchain address. According to some embodiments, agent 506 is delegated as a proof provider by a registrant for a domain name that is to be associated with a blockchain address.

Authority 508 may be any entity that stores an association of a network identifier (e.g., a domain name) to a unique user identifier, which may be created by the authority 508 as described herein. In some embodiments, the authority 500 may also store a password, or the like, in association with the network identifier and the user identifier. According to some embodiments, authority 508 is an authoritative source for storing such associations. In various embodiments, the authority 508 may be responsible for verifying the identity of registrant 502 (see, e.g., 542, 550, and 560 below) and for managing the claims process (see e.g., 562-570 below). In general, agent 506 may act as an intermediary for communications between authority 508 and any other entity, e.g., registrant 502 and/or relying party 504. According to some embodiments, agent 506 and authority 508 are merged.

According to such embodiments, messages between agent 506 and authority 508 may be sent between portions of a single combined entity.

DNS 510 may include any DNS system, e.g., as shown and described above in reference to FIGS. 1-3. Blockchain 512 may be any blockchain, e.g., as shown and described above in reference to FIG. 3.

Method 500 may include multiple parts that accomplish various goals. For example, 520-542 may serve to prove that registrant 502 has control over its domain name (e.g., has registered its domain name) in a DNS environment. Further, 544-550 may establish an account for registrant 502 with authority 508. Yet further, 552-572 may log in registrant 502, provide access to the account of registrant 502 by, for example, relying party 504 and/or agent 506, and enable registrant 502 to grant agent 506 the authority to manage claims. These actions are described in detail presently.

The portion of method 500 that establishes proof of control of the domain name in the DNS environment by registrant 502 may proceed as follows. At 520, method 500 may begin with registrant 502, e.g., using a browser, initiating a "create account" option of relying party 504, e.g., a wallet. At 522, relying party 504 redirects the browser of registrant 502 to agent 506. In various embodiments, the relying party 504 may redirect registrant and browser 502 to an agent 506 based on a criterion or criteria. For example, relying party 504's choice of redirecting to a particular agent 506 may be based on a predetermined criterium such as a previously established relationship between the relying party 504 and the agent 506 or an ability of the agent 506. Examples include a business relationship, a consortium relationship, and the ability of the agent 506 (e.g., of a DNS registrar) to perform and/or support the functions and operations described herein, among others.

At 524, agent 506 requests that registrant 502 provide a domain name to be used as registrant's 502 identification, e.g., for an account of registrant 502 with agent 506 and/or for associating with a blockchain address of registrant 502. At 526, registrant 502 provides a domain name, e.g., registrant.tld, to agent 506. At 528, agent 506 passes the domain name to authority 508. Next, at 530, authority 508 generates a challenge datum. The challenge datum may be a random or pseudorandom number, for example. Authority 508 also records the challenge datum in the account data for registrant 502. According to some embodiments, authority 508 forms a text DNS resource record, such as a resource record denoted _cha, that holds the challenge datum.

At 532, authority 508 passes the challenge datum to agent 506, possibly encapsulated in a _cha resource record. At 534, agent 506 generates an _openID text DNS resource record. In some embodiments, the _openID text DNS resource record may include an identification of authority 508 and/or an identification of agent 506. The identification of agent 506 may be in the form of a domain name registered to agent 506, e.g., agent.tld. The identification of authority 508 may be in the form of a domain name registered to authority 508, e.g., authority.tld. Further at 534, agent 506 passes the _openID and _cha text DNS resource records to registrant 502. According to some embodiments, the actions of 534 may include sending data sufficient for registrant 502 to form _cha and _openID, instead of sending the actual records themselves.

Next, at 536, registrant 502 causes _cha and _openID to be stored in the zone file for its domain name, registrant.tld. For example, registrant 502 may send such data to a registrar for domain name registrant.tld for conveyance to the zone file for registrant.tld. After these data are added to the zone file, the signature resource record, RRSIG, is updated with signatures for the new data, e.g., by a DNS operator. The signatures may be produced by a zone signing key for the zone. At 538, registrant 502 notifies agent 506 that the zone file for registrant.tld has been updated, and at 540, agent 506 notifies authority 508 that the _cha datum is in the zone file. At 542, authority 508 checks whether the datum in the zone file for registrant.tld matches the challenge datum from _cha in its records. For example, authority 508 may retrieve any _cha record from the zone file for the domain name registrant.tld of registrant 502 and compare it to the challenge datum that is stored in its account data (e.g., from 530) for registrant 502. If these data do not match, e.g., if they are not identical, then method 500 may halt with an error message. Otherwise, if these data match, e.g., are identical, then authority 508 generates a sign-up link, e.g., a URL, for signing up registrant 502, and method 500 proceeds to 544.

The portion of method 500 that establishes an account for registrant 502 with authority 508 may proceed as follows. At 544, authority 508 passes the sign-up link (e.g., URL) to agent 506. The link may be unique to the registrant 502, for example, the link 502 may include a unique code associated with registrant 502 in the records of authority 508, for example. At 546, agent 506 passes the sign-up link to registrant 502. At 548, registrant 502 activates the sign-up link, which initiates a dialog with authority 508, e.g., using the browser of registrant 502. As part of 548, registrant may select a password. At 550, authority 508 sets a user identification for registrant 502. The user identification may be different from the domain name of registrant 502, registrant.tld. Also as part of 550, authority 508 finalizes the account set up for registrant 502, e.g., by storing the user identification in association with its records for registrant 502.

The portion of method 500 that includes registrant 502 logging in with agent 506 and expediting further logins may proceed as follows. At 552, registrant 502 signs in to its account with agent 506, e.g., using a user interface provided on a web page by agent 506. For example, registrant 502 may provide its domain name, registrant.tld, and password (e.g., see 548, 550) to agent 506. At 554, agent 506 requests from DNS 510 the _openID record stored in the zone file of the domain name of registrant 502. At 556, DNS 510 returns the _openID record to agent 506. Agent 506 proceeds to parse the record to obtain the identification of authority 508, e.g., authority.tld. At 558, agent 506 redirects the browser of registrant 502 to authority 508 for registrant 502 to log in. At 560, registrant 502 logs in with authority 508, e.g., by supplying its domain name (or user identification) and password. After logging in, registrant 502 may request that the agent 506 be allowed to manage one or more claims, or all claims, on behalf of registrant 502, (e.g., a claim for registrant 502's domain name). At 562, authority 508 requests that registrant 502 confirm that it wishes to have agent 506 manage its claims, (e.g., by having agent 506 generate a proof of domain name control), and registrant 502 proceeds to so confirm. At 564, authority 508 redirects the browser of registrant 502 to agent 506 using, for example, an OAUTH code flow, e.g., by providing a URL with an authorization code for gaining access. Thus, at 566, with the browser of registrant 502 redirected to agent 506, agent 506 proceeds to extract the authorization code from the redirection URL. At 568, agent 506 exchanges the extracted code for one or more access tokens from authority 508, which authority 508 provides to agent 506 at 570. Thereafter, according to some embodiments, agent 506 may take actions on behalf of registrant 502 regarding the domain name (e.g., associating the domain name with a blockchain address) without further involvement of registrant 502.

At 572, agent 506 proceeds to generate claims data for registrant 502. The claims data may include two parts. A first part may associate the domain name of registrant 502, registrant.tld, with authority 508. This first part may be implemented, for example, as a string that includes a field identifying its contents and a field identifying the domain name of registrant 502. For example, referring for a moment to the claims data 604 of FIG. 6, the first part may implemented as the string "authority.domain, registrant.tld", where "authority.domain" indicates that the following domain name ("registrant.tld") has an account with authority 508.

The second part of the claims data may be implemented, for example, as a string that includes a field identifying its contents and a field containing a signature on the first part. For example, referring again to 604 of FIG. 6, the second part may implemented as the string "authority.domainproof, 0x4ba . . . ", where "authority.domainproof" indicates that the following string, "0x4ba . . . ", is a digital signature on the first part by the private key of the proof key pair of agent 506. Agent 506 proceeds to store both parts of the claims data in the records associated with registrant 502.

Figure 6:
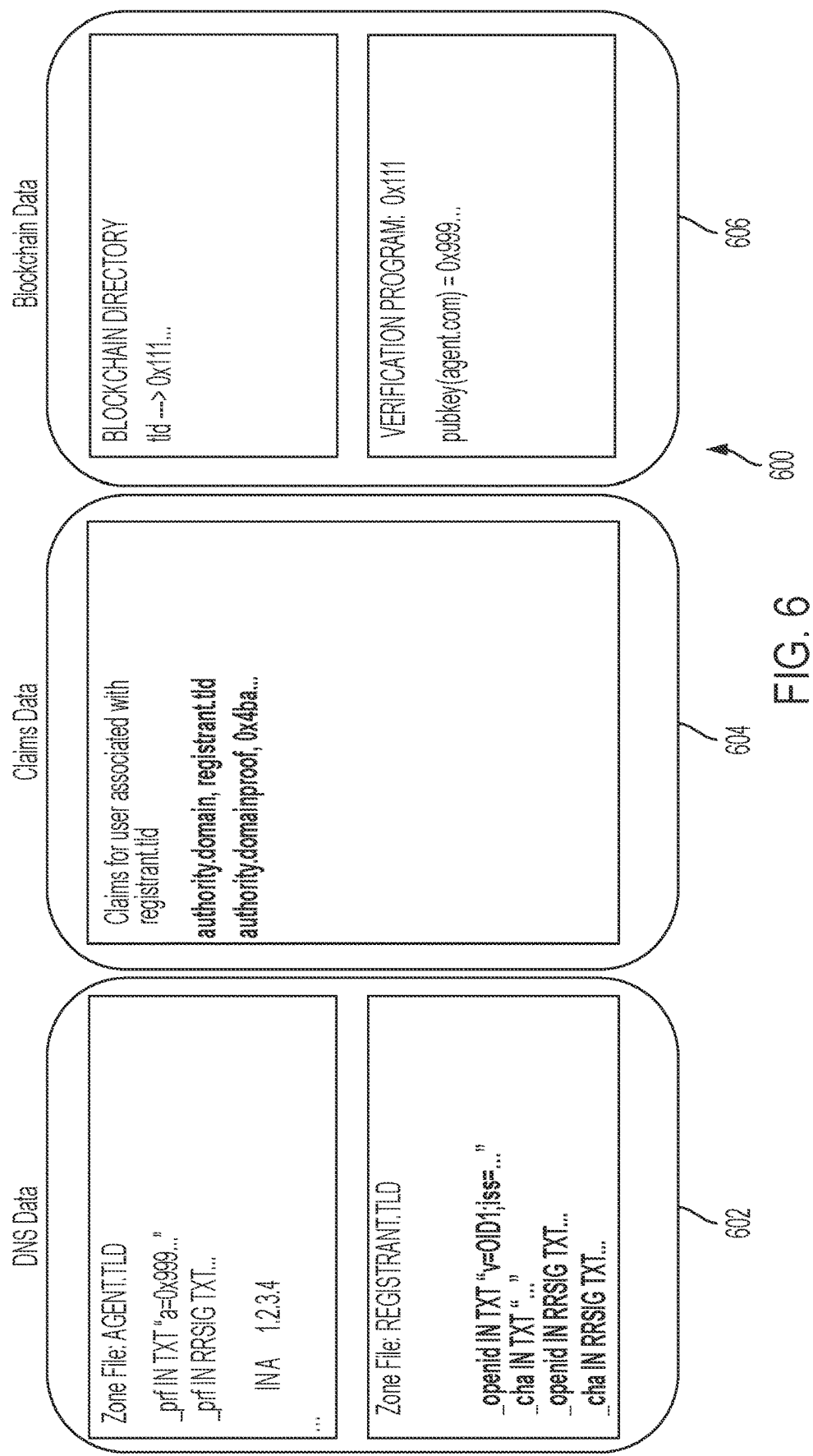
FIG. 6 is a state diagram of DNS data, claims data, and blockchain data after application of an embodiment of the method of FIG. 5.

FIG. 6 is a state diagram 600 of DNS data 602, claims data 604, and blockchain data 606 after application of method 500. Data that has changed relative to state diagram 400 is represented in bold. As shown, DNS data 602 includes _openID and _cha DNS resource records as provided to it by agent 506 per 534 of method 500. DNS data 602 further includes signatures on the _openID and _cha resource records. The signatures may be produced by a zone signing key for the zone and may be included in a DNSSEC signature resource record (RRSIG). Further, claims data 604 includes claims data for registrant 502, e.g., the user who registered the network identifier "registrant.tld". In the example shown, claims data 604 currently includes "authority.domain, registrant.tld" and "authority.domainproof, 0x4ba . . . " as described above in reference to FIG. 5.

IV. Associating a Domain Name with a Blockchain Address in an Agent's Records

Figure 7:
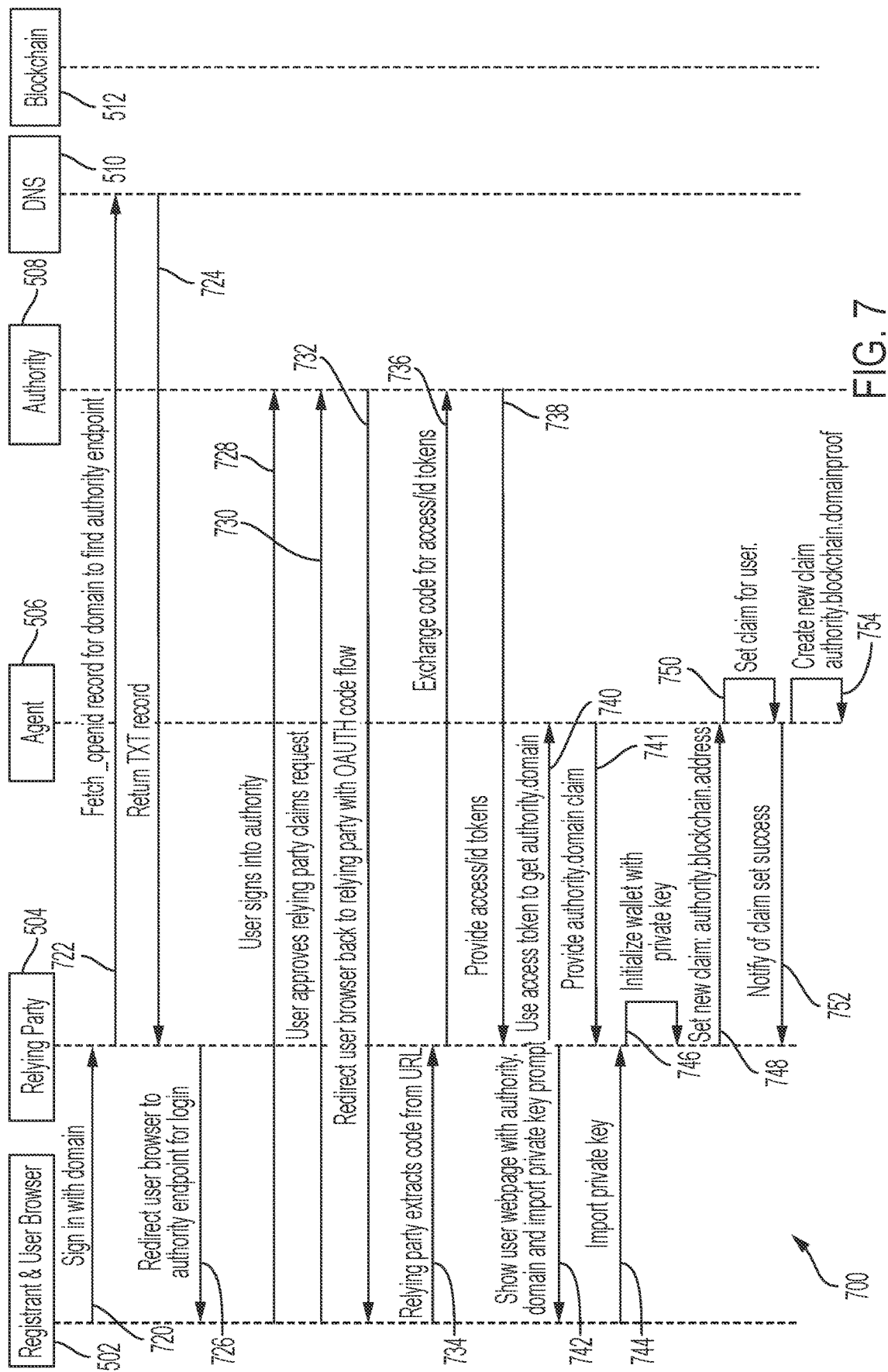
FIG. 7 is a messaging diagram for a method of establishing an association of a network identifier with a blockchain address with an agent according to various embodiments.

FIG. 7 is a messaging diagram for a method of associating a domain name with a blockchain address in the records of agent 506 according to various embodiments. Before an application of method 700, DNS data, claims data, and blockchain data may be as shown and described above in reference to FIG. 6. After an application of method 700, DNS data, claims data, and blockchain data may be as shown and described below in reference to FIG. 8. Method 700 is shown and described in reference to the same entities shown and described above in reference to method 500 of FIG. 5, e.g., registrant 502, relying party 504, agent 506, authority 508, DNS 510, and blockchain 512.

Method 700 may include multiple parts that accomplish various goals. For example, 720-726 serve to identify the appropriate authority, e.g., authority 508. Further, 728-38 serve to provide relying party 504 with access to the account of registrant 502 at authority 508. Yet further, 740-754 serve to associate the domain name of registrant 502 with the blockchain address of registrant 502 in the records of agent 506. These actions are described in detail presently.

The portion of method 700 that includes identifying the appropriate authority may proceed as follows. At 720, registrant 502 signs in with relying party 504, e.g., by providing the domain name of registrant 502, e.g., registrant.tld. At 722, relying party 504 requests from DNS 510 the _openID record stored in the zone file of the domain name of registrant 502. At 724, DNS 510 returns the _openID record to relying party 504. Relying party 504 proceeds to parse the record to obtain the identification of authority 508, e.g., authority.tld. At 726, relying party 504 redirects the browser of registrant 502 to authority 508 for registrant 502 to log in. In various embodiments, relying party 504 and/or registrant 502 may store the identification of authority 508, (e.g., authority.tld) for future use, such as in method 900 of FIG. 9.

The portion of method 700 that includes providing relying party 504 with access to the account of registrant 502 may proceed as follows. At 728, registrant 502 logs in with authority 508, e.g., by supplying its domain name (or user identification) and password to a user interface on a web page provided by authority 508 and accessed by a browser of registrant 502. At 730, registrant 502 approves or authorizes a request of relying party 504 to establish an association of the domain name of registrant 502 with the blockchain address of registrant 502, e.g., using the web page interface of authority 508. At 732, authority 508 redirects the browser of registrant 502 back to relying party 504, e.g., using an OAUTH code embedded in an URL.

At 734, relying party 504 extracts the OAUTH code from the URL provided by authority 508. At 736, relying party 504 provides the OAUTH code to authority 508 and requests one or more access token. At 738, authority 508 provides the requested access token(s) to relying party 504. Thus in this example, the relying party 504 receives or obtains an authorization (e.g., in the form of the OAUTH code) from registrant 502, where the authorization enables relying part 504 to send information to, and interact with, agent 506 as described herein. In various embodiments, relying party 504 and/or registrant 502 may store the access token for future use, such as during method 900 of FIG. 9.

The portion of method 700 that includes associating the domain name of registrant 502 with the blockchain address of registrant 502 in the records of agent 506 may proceed as follows. At 740, relying party 504 uses the access token to log in to the account of registrant 502 with agent 506 and at 741 retrieves the authority.domain record, which lists the domain name of registrant 502, registrant.tld, for example as shown in 604 of FIG. 6. At 742, relying party 504 displays to registrant 502, e.g., in a browser of registrant 502, the domain name "registrant.tld" from the authority.domain record as well as a prompt to confirm that this is the domain name that registrant 502 wishes to associate with its blockchain address. Relying party 742 also displays to registrant 502 a prompt to import (e.g., generate) a blockchain private key of registrant 502 if it has not yet been imported. At 744, registrant 502 authorizes the displayed domain name and blockchain private key importation, and registrant 502 imports its blockchain private key to replying party 504. Thus, in the embodiment shown in FIG. 7, the registrant 502 sends an authorization, including private key 744, which is received by relying party 504, and which enables the relying party 504 to interact with the agent 506 as described below.

At 746, relying party 504 initializes with the private key of registrant 502. At 748, relying party 504 accesses the account of registrant 502 at agent 506 and requests that agent 506 set a new claim in the records of registrant 502, such as a new claim for an authority blockchain address. The request may include the blockchain address of registrant 502, e.g., "0x123 . . . ". At 750, agent 506 sets the requested new claim, e.g., by storing the blockchain address of registrant 502 in its records for registrant 502. The new claim may be of the form of a string including a field labelling the claim's contents, in this example "authority.blockchain.address", and including a field specifying the blockchain address of registrant 502, e.g., "0x123 . . . " as shown in the example of claims data 804 of FIG. 8. At 752, agent 506 notifies relying party 504 that the new claim was successfully stored in its records. At 754, agent 506 creates another new claim by storing in its records for registrant 502 a digital signature on an association of the blockchain address and the domain name of registrant 502. The association may be in the form of an ordered pair (e.g., an attribute-value pair) that includes the domain name of registrant 502 and the blockchain address, e.g., "(registrant.tld, 0x123 . . . )". The signature on this association may be produced by the private key of the proof key pair of agent 506. In some embodiments, this signature linking the domain name and blockchain address may include or incorporate a nonce, a time to live (TTL), an expiration date, or the like. The claim of 754 (e.g., "authority.blockchain.domainproof, 0xf . . . ") may be stored in claims data 804, as shown in the example of FIG. 8.

Figure 8:
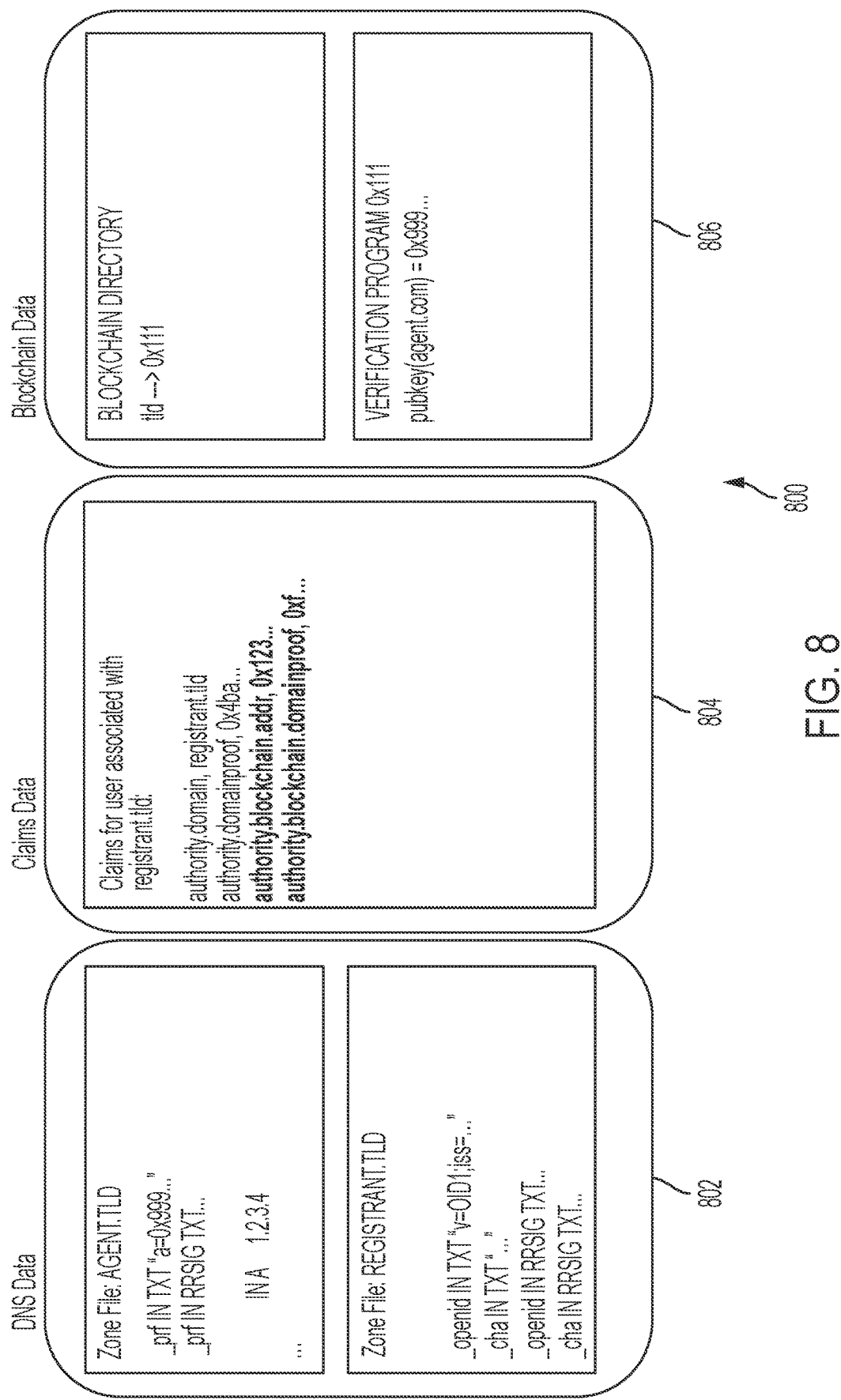
FIG. 8 is a state diagram of DNS data, claims data, and blockchain data after application of an embodiment of the method of FIG. 7.

FIG. 8 is a schematic state diagram 800 of DNS data 802, claims data 804, and blockchain data 806 after application of method 700. Data that has changed relative to state diagram 600 is represented in bold. As shown, claims data 804 for registrant 502 includes authority.blockchain.addr and authority.blockchain.domainproof claims set per 750 and 754 of method 700.

V. Associating a Domain Name with a Blockchain Address in a Blockchain Environment FIG. 9 a messaging diagram for a method 900 of establishing an association of a network identifier with a blockchain address in a blockchain environment according to various embodiments. Before an application of method 900, DNS data, claims data, and blockchain data may be as shown and described above in reference to FIG. 8. After an application of method 900, DNS data, claims data, and blockchain data may be as shown and described below in reference to FIG. 10. Method 900 is shown and described in reference to the same entities shown and described above in reference to method 500 of FIG. 5, e.g., registrant 502, relying party 504, agent 506, authority 508, DNS 510, and blockchain 512.

At 902, relying party 504 contacts agent 506, e.g., using or otherwise based on an access token as acquired using method 700, to request the signed association of the domain name and blockchain address of registrant 502, authority.blockchain.domainproof. At 904, agent 506 returns the requested data to relying party 504. At 906, relying party 504 notifies registrant 502 that it may claim the association of its blockchain address with its domain name on the blockchain. For example, relying party 504 may display a prompt on a browser of registrant 502 asking whether registrant 502 wishes to claim its domain name on the blockchain. At 908, registrant 504 responds in the affirmative, e.g., by clicking on a button labeled "claim domain name on blockchain".

At 910, relying party 504 obtains data sufficient to validate a trust chain from the root zone key signing key public key to an identification of the proof public key of agent 506, e.g., as located in a DNS resource record such as _prf as shown and described above in reference to FIGS. 3 and 4. According to some embodiments, relying party 504 also obtains data sufficient to validate a trust chain from the root zone key signing key public key to an identification of agent 506, e.g., as located in a DNS resource record such as _openID as shown and described above in reference to FIGS. 5-7. Thus, per 910, relying party 504 may retrieve data from one or more zone files in DNS 510.

In general, data sufficient to validate a trust chain per 910 may include, for example, a public key from a KSK DNSKEY resource record, where the corresponding private key is used to sign the zone signing key for the zone. Such data may also include, for example, a public key from a ZSK DNSKEY resource record, where the corresponding private key is used to sign the data in the zone file. Such data may further include, for example, a signature from an RRSIG resource record that includes the ZSK signature on the contents of root zone file, e.g., on an _openID, and/or _prf resource record. Such data may further include, for example, a signature from an RRSIG resource record that includes a KSK signature on the ZSK public key. Such data may further include, for example, a hash from the root anchor DS resource record and the public key from the KSK resource record in the root zone. From such data, and possibly analogous data from subsequent zones, for example, a trust chain from the root anchor DS resource record up to the contents of the _prf and _openID resource records may be validated.

At 912, relying party 504 submits to blockchain 512 (e.g., verification program 306) a request to associate the blockchain address of registrant 502 with the domain name of registrant 502. The request may include the blockchain address (e.g., 0x123 . . . as shown in the example of claims data 804) and the domain name (e.g., registrant.tld). The request may further include the signature of agent 506 on the association of the blockchain address with the domain name, e.g., as stored in the authority.blockchain.domainproof claims data (e.g., 0xf . . . ) of agent 506 for registrant 502. The request may further include the data sufficient to validate a trust chain from the root anchor DS resource record to the identification of the location of the public key of the proof key pair of agent 506, e.g., as stored in an _prf DNS resource record, as shown in the example of DNS data 802. The request may further include the data sufficient to validate a trust chain from the root anchor DS resource record to the identification of agent 506, e.g., as stored in an _openID resource record.

At 914, the blockchain, e.g., verification program 306, verifies the data provided at 912. Verification using verification program 306 may proceed as described in detail with reference to FIG. 3. If any of the provided data fail the verification, then method 900 may halt with an error message. Otherwise, if all provided data are successfully verified, then the blockchain stores the association, e.g., in blockchain directory 310, and method 900 may proceed to 916.

At 916, blockchain 512, e.g., verification program 306, notifies relying party 504 that the association has been successfully stored in the blockchain. And at 918, relying party 504 may notify registrant 502 that the association has been successfully stored in the blockchain environment, for example, the browser 502's user interface may indicate that registrant 502 has successfully claimed the domain name.

Figure 10:
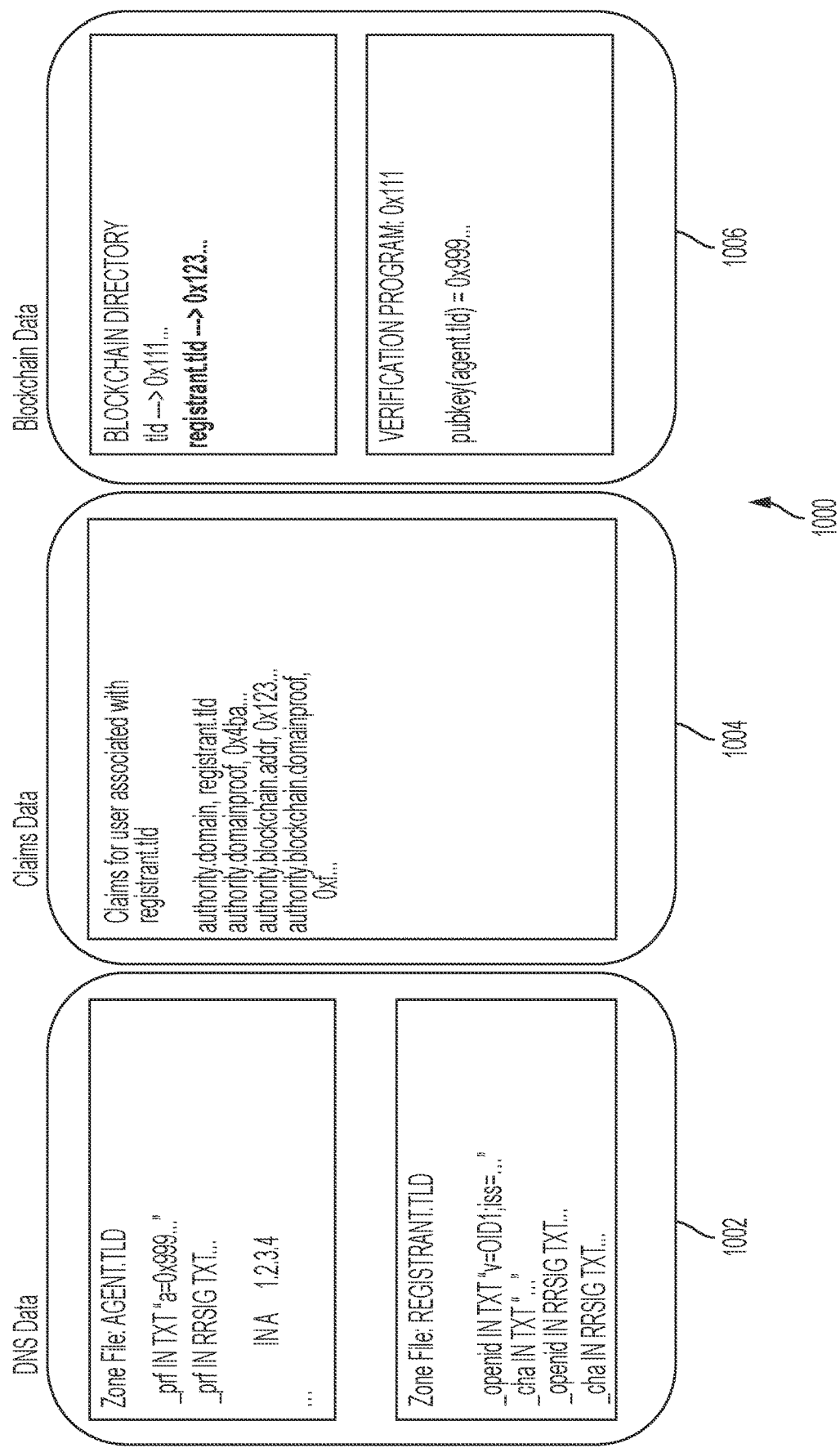
FIG. 10 is a schematic state diagram of DNS data, claims data, and blockchain data after application of an embodiment of the method of FIG. 9.

FIG. 10 is a schematic state diagram 1000 of DNS data 1002, claims data 1004, and blockchain data 1006 after application of method 900. Data that has changed relative to state diagram 800 is represented in bold. As shown, blockchain data 1006 for registrant 502 now includes an association of the domain name of registrant 502, registrant.tld, with the blockchain address of registrant 502, 0x123 . . . , which was set per 914 of method 900.

Figure 11:
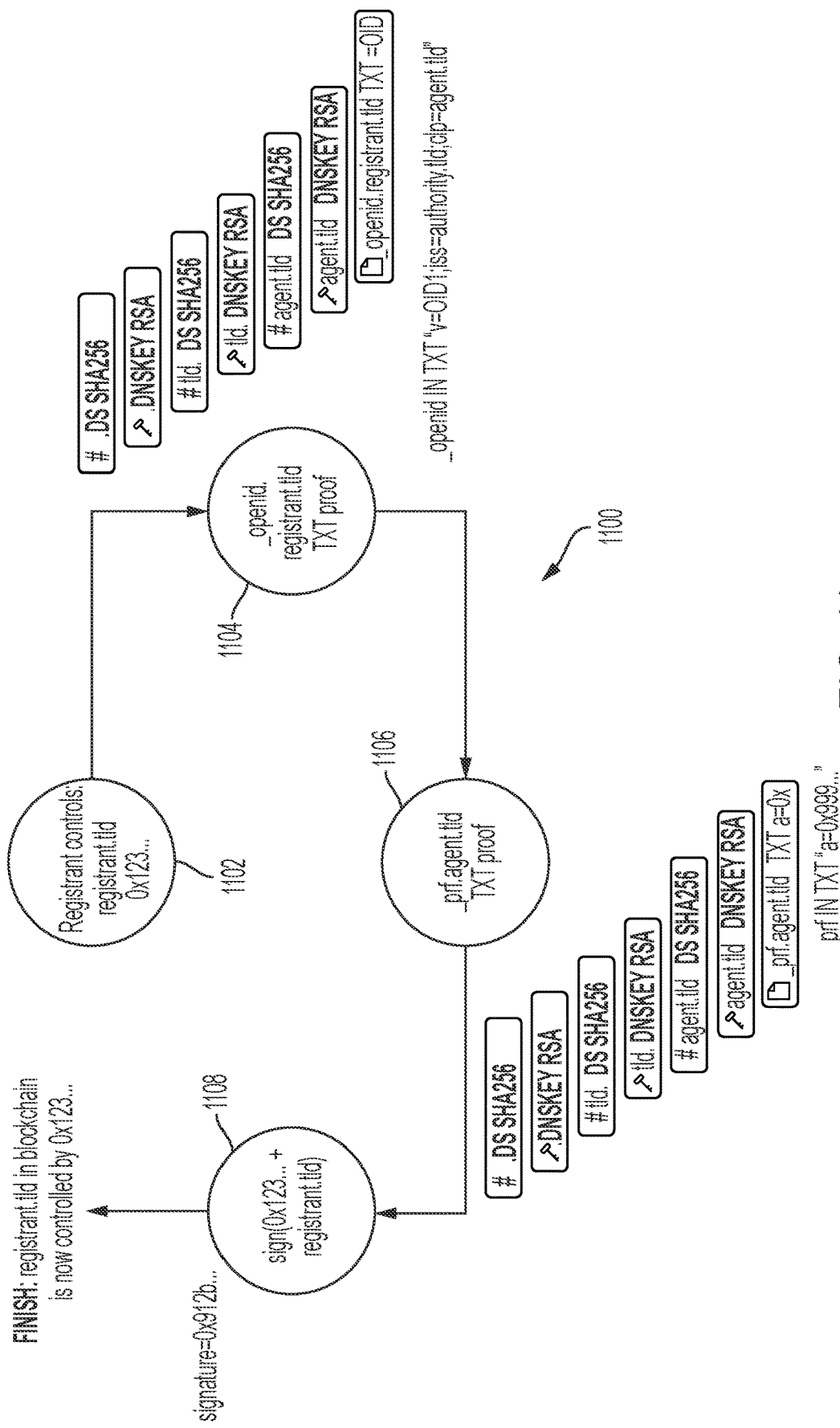
FIG. 11 is a schematic diagram depicting proof acquisition and proof types as used by various embodiments.

FIG. 11 is a schematic diagram 1100 depicting proof acquisition and proof types as used by various embodiments. For example, FIG. 11 depicts data types that relying party 504 may submit to blockchain 512 as part of method 900. As shown in FIG. 11, a registrant, such as registrant 502, has registered a domain name (e.g., registrant.tld) and controls a blockchain address (e.g., 0x123 . . . ). Any entity, such as relying party 504, may request that the blockchain 512 for which the registrant controls a blockchain address associate the registrant's domain name with the registrant's blockchain address. Such an entity may acquire one or more of the data sets shown and described with reference to FIG. 11 and provide them to the blockchain, e.g., to verification program 306.

For example, at 1104, such an entity may acquire an _openID resource record that holds the identity of agent 506 and data sufficient to validate a trust chain from a root anchor DS DNSSEC resource record to the contents of the _openID resource record. As shown in FIG. 11, the _openID record includes a field that holds the identity of the agent ("clp=agent.tld") that signed the association. However, such information may not convey an identification of the public key that may be used to validate the signature. Nevertheless, at 1106, such an entity may acquire an _prf resource record that holds a copy of the proof public key of the agent's proof key pair and data sufficient to validate a trust chain from a root anchor DS DNSSEC resource record to the contents of the _prf resource record. As shown in FIG. 11, the _prf record includes a field that holds a copy of the agent's public key of its proof key pair ("a=0x999 . . . "). As another example, at 1108, such an entity may acquire a copy of the authority.blockchain.domainproof record that holds the agent's signature on the association of the registrant's domain name with the registrant's blockchain.

Figure 9:
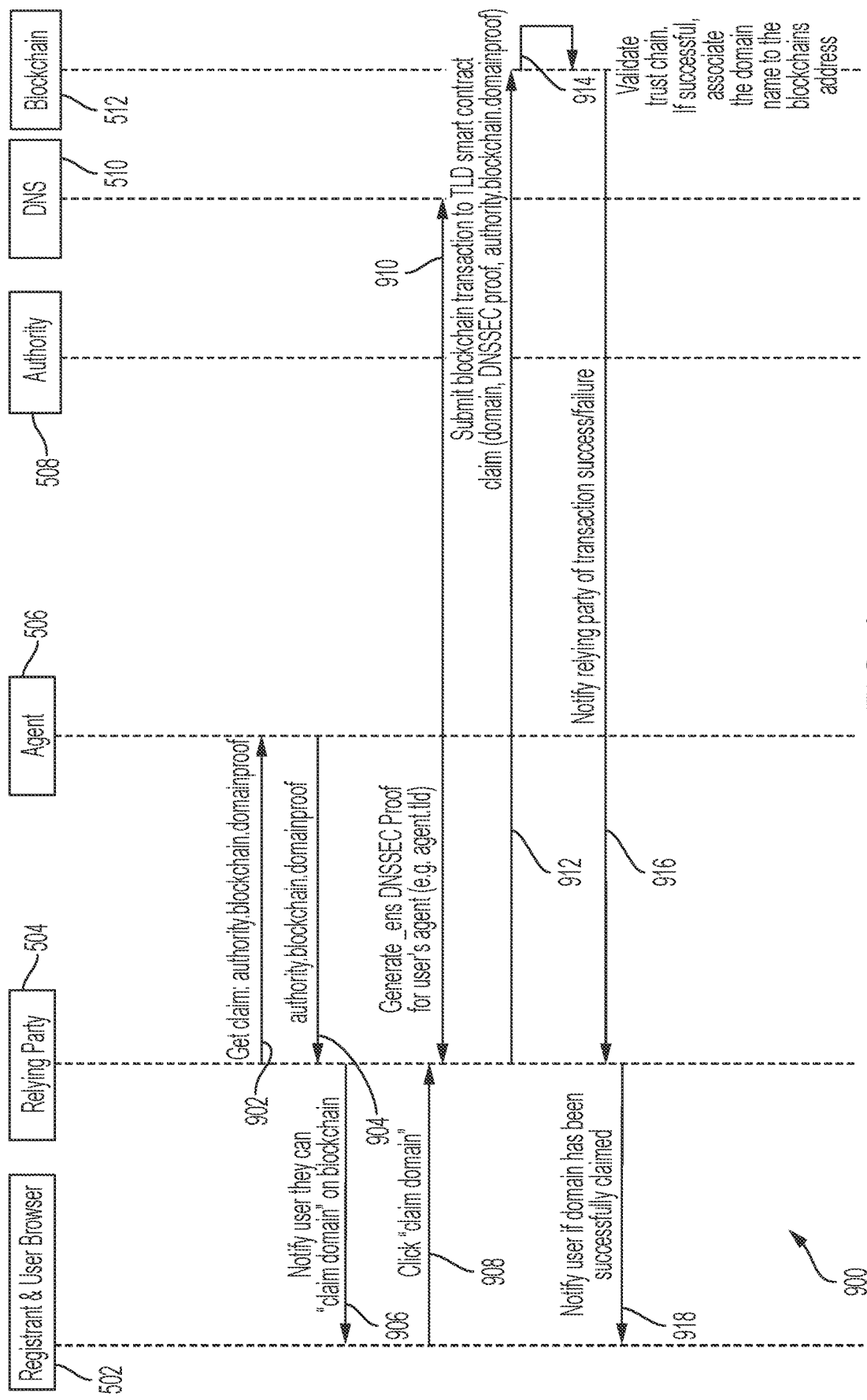
FIG. 9 a messaging diagram for a method of establishing an association of a network identifier with a blockchain address in a blockchain environment according to various embodiments.

After the entity acquires one or more of these data, it may provide them to the blockchain as shown and described in reference to method 900 of FIG. 9 to store the association in the blockchain. After the association is stored, any user of the blockchain may provide the registrant's domain name as the registrant's blockchain address in a blockchain user interface (e.g., a wallet or a relying party 504) for completing any blockchain transaction.

Other embodiments may implement proof acquisition and proof type models that are different than the example shown in FIG. 11. For example, in some embodiments, the agent key may be stored on the blockchain directly, so that there is no need to submit a separate proof of the agent's proof key, and only the _openid and the signature information are submitted as proofs. For another example, in some embodiments, the smart contract only supports the agent such that only the signature is needed because the smart contract knows how to validate the signature.

Figure 12:
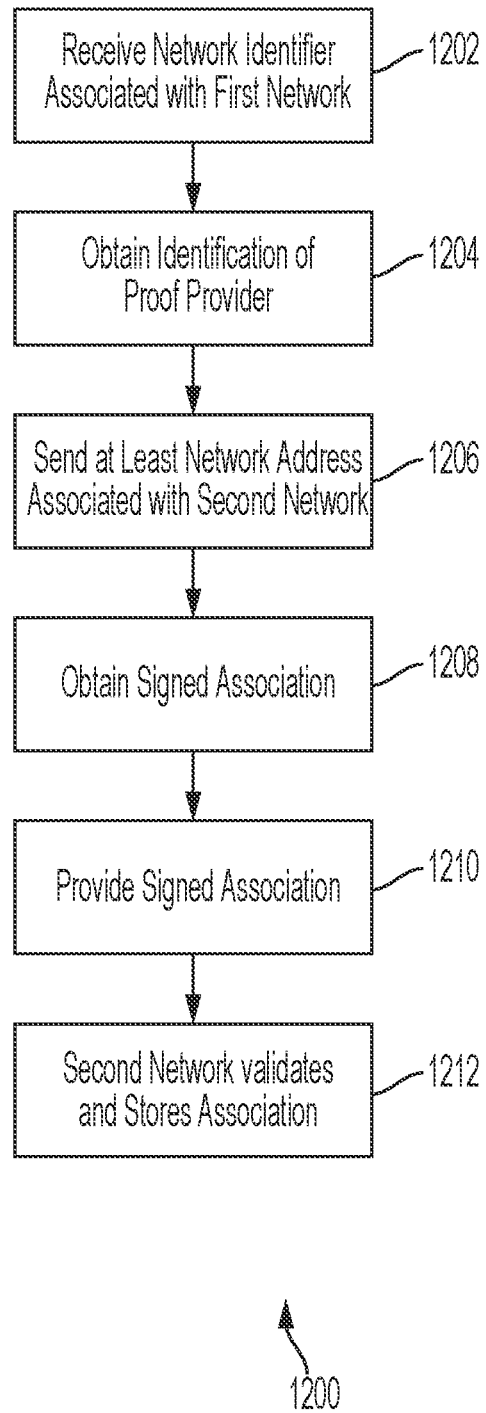
FIG. 12 is a flow diagram for a method of associating a network identifier with a network address according to various embodiments.

FIG. 12 is a flow diagram for a method 1200 of associating a network identifier with a network address according to various embodiments. Method 1200 may include all or portions of methods 300, 500, 700, and/or 900. Method 1200 may be implemented using hardware as shown and described herein in reference to FIG. 13.

At 1202, method 1200 includes receiving a network identifier that is associated with a first network, such as a domain name (e.g., registrant.tld) or the like. By way of non-limiting example, the actions of 1202 may include some or all of the actions of 720 of method 700 as shown and described herein in reference to FIG. 7.

At 1204, method 1200 includes obtaining an identification of a proof provider (e.g., the identifier "agent.tld" of the agent 506). In some embodiments, the identification of the proof provider may be obtained based on or using a network resource record. By way of non-limiting example, the actions of 1204 may include some or all of the actions of 722, 724 in FIG. 7. In other examples, for instance in the context of FIG. 9, the actions of 1204 may include using an access token to obtain the identity of the proof provider, and/or using a stored identification (e.g., agent.tld) of the proof provider, which was previously saved, for example, during execution of the method 700. In such examples, the identification of the proof provider represented in the access token or the stored identification are based on information from the _openID resource record.

At 1206, method 1200 includes sending, to the proof provider, a network address that is associated with a second network (e.g., a blockchain address of registrant 502), where the proof provider is configured to generate a signed association of the network identifier with the network address using a private key of a cryptographic key pair of the proof provider. By way of non-limiting example, the actions of 1206 may include some or all of the actions of 748 of method 700 as shown and described herein in reference to FIG. 7, and the proof provider may create a digital signature (e.g., cryptographic signature) of the network address in combination with the network identifier, such as the signature associated with authority.blockchain.domainproof as shown in claims data 804 of FIG. 8. In some embodiments, the method 1200 may further include receiving an authorization before the network address is sent to the proof provider at 1206, such that network address will not be sent unless the authorization is received. In some such embodiments, the authorization may come from a user associated with the network identifier, such as a registrant of the network identifier.

At 1208, method 1200 includes obtaining the signed association. By way of non-limiting example, the actions of 1208 may include some or all of the actions of 902 and/or 904 of method 900 as shown and described herein in reference to FIG. 9.

At 1210, method 1200 includes providing, to the second network (e.g., the blockchain 512), at least the signed association. By way of non-limiting example, the actions of 1210 may include some or all of the actions of 912 of method 900 as shown and described herein in reference to FIG. 9.

At 1212, as a result of the previous actions, method 1200 includes the second network validating the signed association and storing the association. By way of non-limiting example, the actions of 1212 may include some or all of the actions of 914 of method 900 as shown and described herein in reference to FIG. 9, and the stored association between the registrant's domain name and the blockchain address may be represented as an association between the network address "registrant.tld" and the blockchain address "0x123 . . . " as shown in the example of blockchain data 1006 in FIG. 10.

VI. Example System and Hardware

Figure 13:
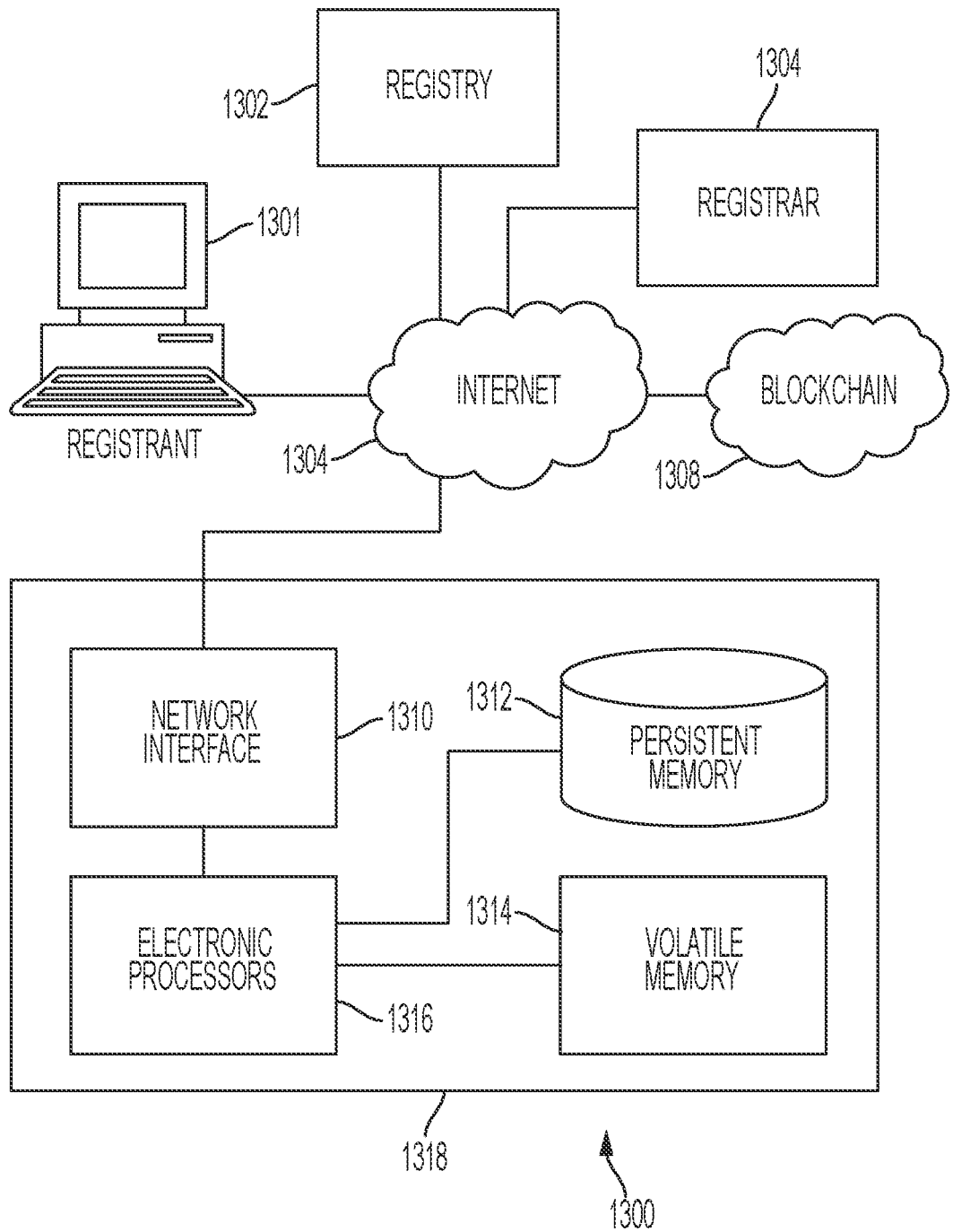
FIG. 13 is a schematic diagram of a system according to various embodiments.

FIG. 13 is a schematic diagram of a system 1300 according to various embodiments. System 1300 includes, for example, registrant 1301 (identified with the computer of registrant 1301), registry 1302, registrar 1304, and server computer 1318, all communicatively coupled to the internet 1304. System 1300 may also include blockchain 1308. Server computer 1318 may be, for example, a server computer of registry 1302, registrar 1304, or any DNS operator, according to various embodiments. Registry 1302 may be merged with registrar 1304 according to various embodiments. FIG. 13 is intended to display the various components networked together, as well as the internal workings of a server computer consistent with the various, e.g., registry and registrar, servers disclosed herein.

Server computer 1318 may include network interface 1310 to communicatively couple to the internet 1304. Network interface 1310 may include a physical network interface, such as a network adapter. Server computer 1318 may be a special-purpose computer, adapted for reliability and high-bandwidth communications. Thus, server computer 1318 may be embodied in a cluster of individual hardware server computers, for example. Alternately, or in addition, server computer 1318 may include redundant power supplies. Persistent memory 1312 may be in a Redundant Array of Inexpensive Disk drives (RAID) configuration for added reliability, and volatile memory 1314 may be or include Error-Correcting Code (ECC) memory hardware devices. Server computer 1318 further includes one or more electronic processors 1316, which may be multi-core processors suitable for handling large amounts of information. Electronic processors 1316 are communicatively coupled to persistent memory 1312, and may execute instructions stored thereon to at least partially effectuate the methods, techniques, functions, and operations disclosed herein. Electronic processors 1316 are also communicatively coupled to volatile memory 1314.

VII. Variations, Modifications, and Additional Embodiments

Many variations on the disclosed embodiments are possible. For example, embodiments may be used for namespaces other than blockchain namespaces. In other words, embodiments may be used to associate a network identifier with a network address in a network other than a blockchain. Further, embodiments may associate a network identifier other than a domain name with a blockchain address in a blockchain network. Examples of such network identifiers include, but are not limited to, social media handles, telephone number area codes or exchanges, email address domains, digital object architecture handles, and/or other top level network identifiers.

An example use case according to various embodiments may be associating a top level network identifier, such as a top level domain name, with a blockchain address, e.g., the blockchain address of an executable program stored in the blockchain such as verification program 306 and/or blockchain directory 310. By way of non-limiting example, an authoritative record keeper, such as a DNS registry, may take the place of registrant 502 as described in reference to FIGS. 4-12. As a result of such an embodiment, the blockchain may store an association of the top level network identifier with the blockchain address. FIG. 4 depicts in blockchain data 406 an association of the top level domain name dot TLD with the blockchain address "0x111 . . . ". Such as association may allow a registrant of a domain name under the top level identifier to associate such a domain name, e.g., registrant.tld, with a blockchain address.

An example use case for various embodiments may be as follows. A social network may assign a domain name as a username based on a proof provided by an agent, e.g., agent 506, and check against the domain name assigning that agent as its delegated authority. For example, such a user may sign in with the agent at the social network to validate its control of the domain name.

Various embodiments described herein may employ or be part of systems, methods, and products for keeping records in synchronization among the various entities described herein, such as a registry (e.g., 1302), an authority (e.g., 508, an agent (e.g., 506), a first network (e.g., DNS 510), and a second network (e.g., blockchain 512). Examples of such systems, methods, and products may be described in U.S. patent application Ser. No. 17/325,726, filed on May 20, 2021, entitled "Lifecycle Administration of Domain Name Blockchain Addresses", which is hereby incorporated by reference in its entirety.

According to various embodiments, rather than storing information, a network record, such as a DNS resource record, may store a pointer to a location at which such information is stored. The information may be stored in, e.g., a blockchain or network directory according to various embodiments. The pointer may be in any of a variety of forms, e.g., a network address. For example, rather than storing an identification of authority 508 and/or an identification of agent 506, the _openID text DNS resource record, or a different network record, may include a pointer to an identification of authority 508 and/or a pointer to an identification of agent 506. Such information may be authenticated by a combination of one or more of the following: (a) storing a DNSSEC signature on the information as a DNS resource record, (b) storing a DNSSEC signature on the information in a location outside the DNS, e.g., as described in U.S. Pat. No. 9,705,851, "Extending DNSSEC trust chains to objects outside the DNS", which is hereby incorporated by reference in its entirety, and/or (c) storing a hash of the information as a DNS resource record (where the hash of the information may be included in the pointer to the location of the information), and then storing a DNSSEC signature on the hash of the information as a DNS record.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A method implemented by a computing device, the method comprising:
   receiving a domain name associated with a registrant;
   obtaining, based on a Domain Name System (DNS) resource record for the domain name, an identification of a proof provider;
   sending, to the proof provider, a blockchain address associated with a blockchain;
   obtaining, from the proof provider, a signed association between the domain name and the blockchain address, the signed association generated based at least in part on a private key of the proof provider;
   and
   providing, to the blockchain, at least the signed association to validate the signed association of the domain name with the blockchain address and to store the signed association between the domain name the blockchain address in a storage device associated with the blockchain.

2. A method implemented by a computing device, the method comprising:
   receiving a network identifier associated with a first network;
   determining an identification of a proof provider;
   sending, to the proof provider, a network address associated with a second network;
   receiving, from the proof provider, a signed association between the network identifier and the network address, wherein the signed association is generated based on a private key of the proof provider; and
   providing, to the second network, the signed association to validate the signed association and to store the signed association.

3. The method of claim 2, wherein determining the identification of the proof provider is based on a network record.

4. The method of claim 3, wherein the network record comprises a pointer to a location that the identification of the proof provider is stored.

5. The method of claim 2, further comprising,
   obtaining data to validate a trust chain to the identification of the proof provider,
   wherein providing the signed association comprises providing the data to validate the trust chain.

6. The method of claim 2, further comprising:
   sending the signed association to a network identifier infrastructure system associated with the first network for storage in a network record associated with the network identifier.

7. The method of claim 2, wherein the second network represents a blockchain network, and the method further comprising initiating a transaction over the blockchain network using the network identifier.

8. The method of claim 2, further comprising:
   obtaining data to validate a trust chain to a public key of the proof provider,
   wherein providing the signed association comprises providing the data to validate the trust chain, and
   wherein the second network validates the signed association using the public key of the proof provider.

9. The method of claim 2, further comprising:
receiving a notification indicating storage of the signed association between the network identifier and the network address in a network directory associated with the second network.

10. The method of claim 3, wherein the network record comprises an identification of an authority that provides challenge information in the network record to prove control of the network identifier.

11. The method of claim 2, wherein the network identifier comprises at least one of: a social media handle, a telephone number, an email address, a domain name, or a digital object architecture handle.

12. The method of claim 2, further comprising:
receiving, from a registrant of the network identifier, an authorization for sending the network address to the proof provider.

13. A system comprising:
a memory containing instructions; and
a processor, operably connected to the memory, that executes the instructions to perform operations comprising:
receiving a domain name;
obtaining, based on a Domain Name System (DNS) resource record for the domain name, an identification of a proof provider;
sending, to the proof provider, a blockchain address associated with a blockchain, wherein the proof provider generates a signed association between the domain name and the blockchain address using a private key of the proof provider;
obtaining the signed association between the domain name and the blockchain address; and
providing, to the blockchain, at least the signed association of the domain name with the blockchain address to validate the signed association between the domain name and the blockchain address and to store the signed association between the domain name and the blockchain address in the blockchain.

14. A system for associating a network identifier with a network address, the system comprising:
a memory containing instructions; and
a processor, operably connected to the memory, that executes the instructions to perform operations comprising:
receiving a network identifier associated with a first network;
obtaining an identification of a proof provider;
sending, to the proof provider, a network address associated with a second network;
receiving, from the proof provider, a signed association between the network identifier and the network address, wherein the signed association is generated based on private key of the proof provider;
and
providing, to the second network, the signed association to validate the signed association and to store the signed association.

15. The system of claim 14, wherein the obtaining the identification of the proof provider is based on a network record.

16. The system of claim 15, wherein the network record comprises the identification of the proof provider.

17. The system of claim 14, the operations further comprising:
obtaining data to validate a trust chain to the identification of the proof provider, and
wherein providing the signed association comprises providing the data to validate the trust chain.

18. The system of claim 14, the operations further comprising:
sending the signed association to a network identifier infrastructure system associated with the first network for storage in a network record associated with the network identifier.

19. The system of claim 14, wherein the operations further comprise initiating a transaction on the second network using the network identifier.

20. The system of claim 14, the operations further comprising:
obtaining data to validate a trust chain to a public key of the proof provider,
wherein providing the signed association comprises providing the data to validate the trust chain, and
wherein the second network validates the signed association using the public key of the proof provider.

21. The system of claim 14, the operations further comprising:
receiving a notification indicating storage of the signed association between the network identifier and the network address in a network directory associated with the second network.

22. The system of claim 15, wherein the network record comprises an identification of an authority that provides challenge information in the network record to prove control of the network identifier.

23. The system of claim 14, wherein the network identifier comprises at least one of: a social media handle, a telephone number, an email address, a domain name, or a digital object architecture handle.

24. The system of claim 14, the operations further comprising:
receiving, from a registrant of the network identifier, an authorization for sending the network address to the proof provider.

* * * * *